(12) United States Patent
Meister et al.

(10) Patent No.: US 10,362,429 B2
(45) Date of Patent: Jul. 23, 2019

(54) SYSTEMS AND METHODS FOR GENERATING SPATIAL SOUND INFORMATION RELEVANT TO REAL-WORLD ENVIRONMENTS

(71) Applicant: California Institute of Technology, Pasadena, CA (US)

(72) Inventors: Markus Meister, Pasadena, CA (US); Yang Liu, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 15/582,034

(22) Filed: Apr. 28, 2017

(65) Prior Publication Data
US 2017/0318407 A1 Nov. 2, 2017

Related U.S. Application Data

(60) Provisional application No. 62/329,067, filed on Apr. 28, 2016, provisional application No. 62/416,430, filed on Nov. 2, 2016.

(51) Int. Cl.
  H04S 7/00 (2006.01)
  G06T 17/05 (2011.01)
  G06T 19/00 (2011.01)

(52) U.S. Cl.
  CPC ............ H04S 7/303 (2013.01); G06T 17/05 (2013.01); G06T 19/00 (2013.01);
  (Continued)

(58) Field of Classification Search
  CPC .. H04S 7/303; H04S 2400/01; H04S 2400/11; G06T 17/05; G06T 19/00;
  (Continued)

(56) References Cited

U.S. PATENT DOCUMENTS 8,767,968 B2 * 7/2014 Flaks .................... A63F 13/54
  345/633
9,286,711 B2 * 3/2016 Geisner .................. G09G 5/00
  (Continued)

OTHER PUBLICATIONS

"Sound of Vision: Obstacle detector", Sound of Vision, Nov. 6, 2015, Retrieved from: http://www.soundofvision.net/approach/, 4 pgs.

(Continued)

*Primary Examiner* — Jason R Kurr
(74) *Attorney, Agent, or Firm* — KPPB LLP

(57) ABSTRACT

Spatial exploration systems and methods of spatial exploration utilizing spatial sound in accordance with various embodiments of the invention are disclosed. In one embodiment, a spatial exploration system acquires sensor data and constructs a 3D spatial model of a surrounding real world environment. The system can instantiate a 3D object at a location within the 3D spatial model corresponding to the location of a real world feature, determine a location and orientation of a user within the 3D spatial model, and generate an audio clip containing vocalized information describing the feature. The spatial exploration system can then output a spatial sound describing the identified feature by modifying an audio clip based upon the position of the 3D object relative to the location and orientation of the user within the 3D spatial model to encode audio cues as to the location of the feature in the surrounding real world environment.

8 Claims, 40 Drawing Sheets
(33 of 40 Drawing Sheet(s) Filed in Color)

(52) U.S. Cl.
CPC ......... *G06T 2219/004* (2013.01); *H04S 7/304* (2013.01); *H04S 2400/11* (2013.01); *H04S 2420/01* (2013.01)

(58) Field of Classification Search
CPC .............. G06T 2219/004; G06T 19/003; G06T 19/006; H04R 5/02
USPC ......................................................... 381/303
See application file for complete search history.

(56) References Cited

U.S. PATENT DOCUMENTS

| | | | |
|---|---|---|---|
| 9,851,434 B2* | 12/2017 | Caporizzo | G01S 7/497 |
| 2006/0293839 A1* | 12/2006 | Stankieiwcz | G01C 21/20 |
| | | | 701/434 |
| 2015/0063610 A1* | 3/2015 | Mossner | H04S 5/005 |
| | | | 381/307 |
| 2015/0196101 A1 | 7/2015 | Dayal et al. | |
| 2016/0008988 A1 | 1/2016 | Kennedy | |
| 2016/0210834 A1 | 7/2016 | Dayal | |
| 2016/0225286 A1 | 8/2016 | Dayal | |
| 2016/0260309 A1 | 9/2016 | Dayal et al. | |
| 2017/0032787 A1 | 2/2017 | Dayal et al. | |
| 2017/0038792 A1 | 2/2017 | Moore | |

OTHER PUBLICATIONS

Aira.IO, "Aira.IO", Retrieved from: https://web.archive.org/web/20150205032901/https://aira.io/, Feb. 5, 2015.

Bajracharya et al., "Real-time 3d Stereo Mapping in Complex Dynamic Environments", in International Conference on Robotics and Automation—Semantic Mapping, Perception, and Exploration (SPME) Workshop, 2012, Shanghai, China, 8 pgs.

Brown et al., "Audio-Vision Substitution for Blind Individuals: Addressing Human Information Processing Capacity", IEEE Journal of Selected Topics in Signal Processing, vol. 10, No. 5, Aug. 2016, pp. 924-931.

Bujacz et al., "Sonification: Review of Auditory Display Solutions in Electronic Travel Aids for the Blind", Archives of Acoustics, Sep. 2016, vol. 41, No. 3, pp. 401-414.

Connors et al., "Virtual environments for the transfer of navigation skills in the blind: a comparison of directed instruction vs. video game based learning approaches", Frontiers in Human Neuroscience, May 1, 2014, May 2014, vol. 8, Article 223, doi: 10.3389;fnhum.2014.00223, pp. 1-13.

Cooper, "Computer Vision May Help the Blind See the World", Engadget, Dec. 5, 2016, Retrieved from: https://www.engadget.com/2016/12/05/computer-vision-may-help-the-blind-see-the-world/, 11 pp.

Cooper, "The Ambitious Plan to Help People Get Around", Engadget, Nov. 9, 2016, Retrieved from: https://www.engadget.com/2016/11/09/the-ambitious-plan-to-help-blind-people-get-around/, 9 pgs.

Csapó et al., "A Survey of Assistive Technologies and Applications for Blind Users on Mobile Platforms: a Review and Foundation for Research", Journal of Multimodal User Interfaces, Jun. 18, 2015, vol. 8, pp. 275-286.

Dachis et al., "Stimulant's HoloLens App Helps Navigate Inside Buildings, HoloLens", https://www.hololens.reality.news/news/stimulants-hologens-app-helps-navigate-inside-buildings-0171946, 5 pp., Sep. 2, 2016, 5 pgs.

Danels et al., "Blind Audio Guidance System, University of Houston", www.bipom.com/documents/student_projects/spring2009, 2009, 26 pp.

Dent, Steve, "Headband Detects Obstacles and Guides the Blind Haptically", Engadget, Nov. 20, 2015, Retrieved from: https://www.engadget.com/2015/11/20/headband-detects-obstacles-and-guides-the-blind-haptically/, 9 pgs.

Dong, Meimei, "Electronic Travel Aids (ETA) for Blind Guidance", OTTCP, 16 pgs.

Folmer, Eelke, "Navatar: an Indoor Navigation System for Blind Users using Google Glass", Youtube, Retrieved from: https://www.youtube.com/watch?v=Q07oHm3zh04, Published on Jan. 21, 2014, 2 pgs.

Folmer, Eelke, "Navatar: Navigating Blind Users in Indoor Spaces using Tactile Landmarks", Human Computer Interaction Research, University of Nevada, Reno, Retrieved from: http://eelke.com/projects/navatar-indoor-navigation-blind.html, Printed on Apr. 19, 2017, 2 pp.

Giudice et al., "Blind Navigation and the Role of Technology", In A. Helal et al (Eds.), John Wiley & Sons, Engineering Handbook of Smart Technology for Aging, Disability, and Independence, Sep. 2008, pp. 479-500.

Grant, et al, "The Functional Performance of the BrainPort V100 Device in Persons Who Are Profoundly Blind", Journal of Visual Impairment & Blindness, Mar.-Apr. 2016, pp. 77-88.

Hakobyan et al., "Mobile Assistive Technologies for the Visually Impaired", Survey of Ophthalmology, vol. 58, Sep. 2013, pp. 513-528.

Harper et al., "Emerging Technologies and Web Accessibility: Research Challenges and Opportunities Focusing on Vision Issues", Disability and Rehabilitations: Assistive Technology, Jan. 2012, vol. 7, No. 1, pp. 1-19, first published Dec. 2010.

Jafri, et al., "Computer Vision-Based Object Recognition for the Visually Impaired in an Indoors Environment: A Survey", The Visual Computer, Nov. 2014, vol. 30, Issue 11, pp. 1197-1222, DOI 1.1007/s0037-013-0886-1.

Johnson et al., "A Navigation Aid for the Blind Using Tactile-Visual Sensory Substitution", Biomedical Engineering Program at the University of Arizona, Tucson, Department of Electrical and Computer Engineering/Biomedical Engineering Program at the University of Arizona, Tucson, 4 pgs.

Kanuganti, Suman, "In Recent Podcast, Blind Abilities Explores the Growing Evolution of the Aira Agent", http://timeline.aira.io/in-its-recent-podcast-blind-abilities-explores-the-growing-evolution-of-the-aira-agent/Timeline, 7 pp., Retrieved Feb. 5, 2017.

Kawai, et al., "A Support System for Visually Impaired Persons to Understand Three-Dimensional Visual Information Using Acoustic Interface", National Institute of Advanced Industrial Science and Technology (AIST), 2002 IEEE, pp. 974-977.

Khoo et al., "Multimodal and Alternative Perception for the Visually Impaired: A Survey", Journal of Assistive Technologies, vol. 10 Issue: 1, doi: 10.1108/JAT-04-2015-0014, pp. 11-26.

Li, Kun , "Electronic Travel Aids for Blind Guidance, an Industry Landscape Study", IND ENG 290 Project Report, Fall 2015, Dec. 4, 2015, Berkeley University of California, Sutardja Center for Entrepreneurship & Technology Technical Report, pp. 1-10.

Liao et al., "RFID-Based Road Guiding Cane System for the Visually Impaired", P.L.P. Rau (Ed.): CCD/HCII 2013, Part I, LNCS 8023, 2013, pp. 86-93.

Liu et al., "SceneReader: a high-level visual prosthesis", Society for Neuroscience Meeting, 2016, 1, pg.

Loeliger et al., "Wayfinding Without Visual Cues: Evaluation of an Interactive Audio Map System", Interacting with Computers, vol. 26, No. 5, 2014, pp. 403-416, advance access publication Aug. 20, 2013.

Mcgrory et al., "Optimizing the Functionality of Clients with Age-Related Macular Degeneration", Rehabilitation Nursing, vol. 29, No. 3, May/Jun. 2004, pp. 90-94.

Meijer et al., "An Experimental System for Auditory Image Representations", IEEE Transactions on Biomedical Engineering, vol. 39, No. 2, Feb. 1992, pp. 112-121.

Meister, Markus, "Blind user indoor navigation with a virtual guide", Youtube, Retrieved from: https://www.youtube.com/watch?v=j2aLtGKx5P0, Published on Mar. 14, 2017, 1 pg.

Moon, Mariella, "Microsoft's Bone-Conducting Headset Guides the Blind With Audio Cues", Engadget, Nov. 6, 2014, Retrieved from: https://www.engadget.com/2014/11/06/microsoft-headset-for-the-visually-impaired/, 10 pgs.

Pauls, Jamie, "Project BLAID: Toyota's Contribution to Indoor Navigation for the Blind", AccessWorld Magazine, vol. 17, No. 5, May 2016, Retrieved from: http://www.afb.org/afbpress/pubnew.asp?/DocID=aw170505, 6 pgs.

(56) References Cited

OTHER PUBLICATIONS

Rigg, Jamie, "Toyota's Wearable for the Blind Sees the World Through Cameras", Engadget, Mar. 7, 2016, Retrieved from: https://www.engadget.com/2016/03/07/toyota-project-blaid/, 9 pgs.
Roentgen et al., "The Development of an Indoor Mobility Course for the Evaluation of Electronic Mobility Aids for Persons Who Are Visually Impaired", Assistive Technology, The Official Journal of RESNA, Sep. 2012, vol. 24, Issue 2, pp. 143-154.
Sanz et al., "Scenes and Images Into Sounds: A Taxonomy of Image Sonification Methods for Mobility Applications", Journal of the Audio Engineering Society, Mar. 2014, vol. 62, No. 3, pp. 161-171.
Seelman, et al, "Quality-of-Life Technology for Vision and Hearing Loss", IEEE Engineering in Medicine and Biology Magazine, Mar./Apr. 2008, pp. 40-55.
Souppouris, Aaron, "Wayfindr gets Google grant to solve navigation for the blind", Engadget, Dec. 3, 2015, Retrieved from: https://www.engadget.com/2015/12/03/wayfindr-blind-navigation-standard-google-org-grant/, 16 pgs.
Stiles et al., "Auditory Sensory Substitution is Intuitive and Automatic with Texture Stimuli", Scientific Reports, vol. 5, Article No. 15628, Oct. 22, 2015, 14 pgs.
Stronks et al., "The Role of Visual Deprivation and Experience on the Performance of Sensory Substitution Devices", Brain Research, 2015, vol. 1624, pp. 140-152, available online Jul. 14, 2015.
Stronks et al., "Visual Task Performance in the Blind with the BrainPort V100 Vision Aid", Expert Review of Medical Devices, 2016, vol. 13, No. 10, pp. 919-931. https://dx.doi.org/10.1080/17434440.2016.1237287.
Strumillo, Pawel, "Electronic Systems Aiding Spatial Orientation and Mobility of the Visually Impaired", Human-Computer Systems Interaction, Jun. 2010, pp. 373-386.
Thaler et al., "Echolocation in Humans: An Overview", WIREs Cogn Sci., Nov./Dec. 2016, vol. 7, pp. 382-393, Doi: 10.1002/wcs.1408.
Tian et al., "Toward a Computer Vision-Based Wayfinding Aid for Blind Persons to Access Unfamiliar Indoor Environments", Machine Vision and Applications, Apr. 2013, vol. 24, No. 3, pp. 521-535.
Velázquez, Ramiro, "Wearable Assistive Devices for the Blind", Chapter 17 in A. Lay-Ekuakille & S.C. Mukhopadhyay (Eds.), "Wearable and Autonomous Biomedical Devices and Systems for Smart Environment: Issues and Characterization", LNEE 75, Springer, Oct. 2010, pp. 331-349.
Walt Disney World, "Services for Guests with Visual Disabilities", Retrieved from: https://web.archive.org/web/20140103142910/https://disneyworld.disney.go.com/guest-services/visual-disability-services/, Jan. 3, 2014, 3 pgs.
Warnick, Jennifer, "Independence Day—A New Pilot Program Sets People with Sight Loss Free to Experience Cities Like Never Before", Nov. 9, 2014, Retrieved from: https://web.archive.org/web/20141109031342/http://news.microsoft.com/stories/independence-day/, 37 pgs.
Wayfinder, "Open Standard", Dec. 15, 2016, Retrieved from: https://www.wayfindr.net/open-standard, 4 pgs.
Weiland et al., "Retinal Prosthesis", IEEE Transactions on Biomedical Engineering, vol. 61, No. 5, 2014, pp. 1412-1424.
Werblin et al., "Restoring Vision to the Blind: Advancements in Vision Aids for the Visually Impaired", The Lasker/IRRF Initiative for Innovation in Vision Science, Foundation, Chapter 7, 2014, vol. 3, No. 7, Article 9, http://tvstjournal.org/doi/full/10.1167/tcst.3.7.9, pp. 54-62, published online Dec. 30, 2014.
Xu et al., "An Outdoor Navigation Aid System for the Visually Impaired", IEEE International Conference on Industrial Engineering and Engineering Management, Date of Conference: Dec. 7-10, 2010, Macao, China.
Zhigang et al., "Audification-Based Electronic Travel Aid System", 2010 International Conference on Computer Design and Applications (ICCDA 2010), Jan. 2011, vol. 5, pp. V5-137-V5-141.
Crandall, William F., "Introduction to Talking Signs", Mar. 16, 2015, Retrieved from: https://web.archive.org/web/20150316194913/http://www-test.ski.org/Rehab/WCrandall/introts.html, 2 pgs.
Davidat SKI, "Talking Signs demonstration at BART station", YouTube, Retrieved from: https://www.youtube.com/watch?v=fySKwj6Q37w, Published on Feb. 4, 2013, 1 pg.
StepHear, "Step-Hear, an audio signage and way finding solution for the blind and visually impaired . . . mp4", YouTube, Retrieved from: https://www.youtube.com/watch?v=NjGR51VXOvl, Published on Nov. 9, 2011, 1 pg.
"Talking Lights", Sendero Group LLC, 2018, Retrieved from: http://www.senderogroup.com/wayfinding/talklights.html, 2 pgs.
"Accessible Wayfinding", Sendero Group LLC, 2018, Retrieved from: http://www.senderogroup.com/wayfinding/, 3 pgs.
Connors et al., "Development of an audio-based virtual gaming environment to assist with navigation skills in the blind", J Vis Exp., 2013; (73): 50272, Published online Mar. 27, 2013.
Computers Helping People with Special Needs: 15th International Conference, ICCHP 2016, Linz, Austria, Jul. 13-15, 2016, Proceedings, Part II, pp. 1-209.
"NIDRR Wayfinding Grant", Sendero Group LLC, 2017, Retrieved from: http://www.senderogroup.com/wayfinding/nidrrwf.html, 3 pgs.
Coughlan et al., "AR4VI: AR as an Accessibility Tool for People with Visual Impairments", IEEE International Symposium on Mixed and Augmented Reality, Conference date: Oct. 9-13, 2017, Nantes, France, 5 pgs.
Coughlan et al., "Evaluating Author and User Experience for an Audio-Haptic System for Annotation of Physical Models", 19th International ACM SIGACCESS Conference on Computers and Accessibility, Conference date: Oct.-Nov. 2017, Baltimore, MD, 2 pgs.
Golledge et al., "Stated Preferences for Components of a Personal Guidance System for Nonvisual Navigation", Journal of Visual Impairment & Blindness, vol. 98, No. 3, pp. 135-147.
Kendrick, "Walt Disney World Provides Accessibility for Blind Guests", Access World Magazine, vol. 15, No. 8, Aug. 2014, Retrieved from: https://www.afb.org/afbpress/pub.asp?DocID=aw150806, 9 pgs.
Kulyukin et al., "Automated SVG Map Labeling for Customizable Large Print Maps for Low Vision Individuals", RESNA Annual Conference, 2010, Las Vegas, NV, 5 pgs.
Liu et al., "A Flexible Research Platform for Sensory Substitution in a 3D Environment", Cosyne 2016, Salt Lake City, UT, Date of Conference Feb. 25-28, 2016, Publication Date: Feb. 27, 2016, 2 pgs.
Mason et al., "Variability in the Length and Frequency of Steps of Sighted and Visually Impaired Walkers", Journal of Visual Impairments & Blindness, vol. 99, No. 12, 2005, 16 pgs.
Miele, "Human Auditory Perception of Trajectories of Motion in a Simulated Open-Field Environment", Dissertation Submitted, University of California, Berkeley, Fall 2003, 175 pgs.
Miele, "Smith-Jettkewekk Display Tools: A Sonification Toolkit for Matlab", Georgia Institute of Technology, Conference Paper, 2003, 4 pgs.
Miele et al., "Talking TMAP: Automated Generation of Audio-Tactile Maps Using Smith-Kettlewell's TMAP Software", British Journal of Visual Impairment, vol. 24, 2006, 8 pgs.
Morash et al., "Effects of Using Multiple Hands and Fingers on Haptic Performance", Perception, vol. 42, 2013, pp. 759-777.
Morash et al., "Effects of Using Multiple Hands and Fingers on Haptic Performance in Individuals Who are Blind", Perception, vol. 43, 2014, pp. 569-588.
Morash et al., "Guiding Novice Web Workers in Making Image Descriptions using Templates", ACM Transactions on Accessible Computing, vol. 7, No. 12, Nov. 2015, 21 pgs.
Pinheiro et al., "Learning to Segment Object Candidates", Advances in Neural Information Processing Systems, 2015, 9 pgs.
Ponchillia et al., "Accessible GPS: Reorientation and Target Location Among Users with Visual Impairments", Journal of Visual Impairment & Blindness, vol. 101, No. 7, 19 pgs.
Ponchillia et al., "Finding a Target with an Accessible Global Positioning Systems", Journal of Visual Impairment & Blindness, vol. 101, No. 8, pp. 479-488.
Shen et al., "CamIO: A 3D Computer Vision System Enabling Audio/Haptic Interaction with Physical Objects by Blind Users",

(56) References Cited

OTHER PUBLICATIONS

Proceedings of the 15th International ACM SIGACCESS Conference on Computers and Accessibility, Oct. 2013, 2 pgs.

* cited by examiner

Task 1 – Studio

- The subject starts at the center of a 4m by 4m arena in the corner of the virtual room.
- In each trial, one of 10 actionable objects (labeled by white speaker icons) is randomly assigned as the target.

Task 2 – Random chair

- The subject starts at the center of a 4m by 4m arena and is instructed to find a target chair which is randomly placed on one of the four edges of the arena.

- In one condition the subject uses SceneReader (SR), in the other only the cane.

Task 3 – Obstacle avoidance with a virtual guide

- The subject starts from one corner of the arena and the target (fridge) is on the diagonal corner.
- Obstacles (Brown squares in the screenshot) are placed between the starting point and the target to block the straight path.
- A virtual guide stays just 2 steps ahead of the user and guides the user along a pre-computed path (red arrows).
- The virtual guide calls out "follow me" at the user's trigger command and proceeds along the path as long as the user is within the specified distance.

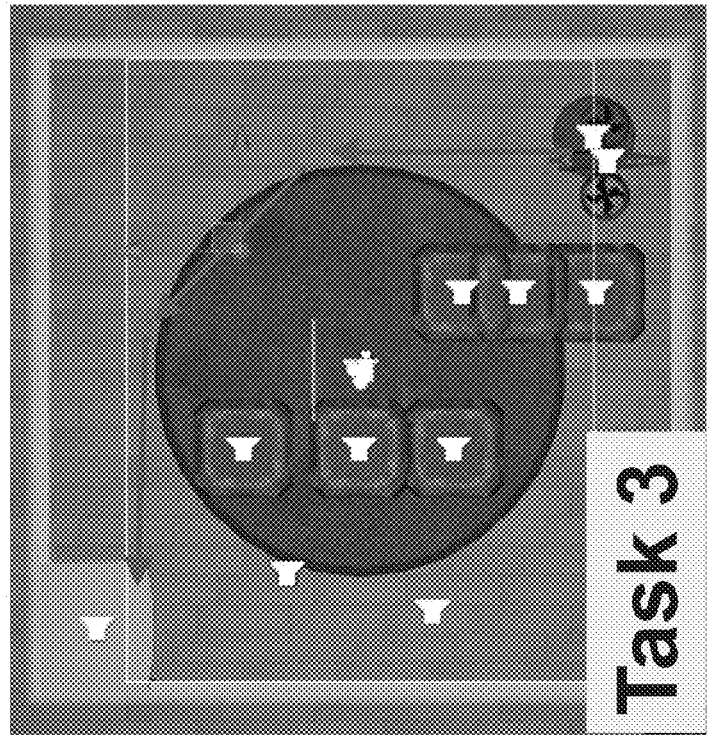

FIG. 20C

SYSTEMS AND METHODS FOR GENERATING SPATIAL SOUND INFORMATION RELEVANT TO REAL-WORLD ENVIRONMENTS

CROSS-REFERENCE TO RELATED APPLICATIONS

The current application claims priority to U.S. Provisional Application Ser. No. 62/329,067, filed Apr. 28, 2016 and U.S. Provisional Patent Application Ser. No. 62/416,430, filed Nov. 2, 2016. The disclosures of U.S. Provisional Application Ser. Nos. 62/329,067 and 62/416,430 are hereby incorporated herein by reference in their entirety.

FIELD OF THE INVENTION

The present application generally relates to machine vision systems and more specifically to utilization of machine vision to generate spatial sound information to assist visually impaired users explore a real world environment. The present application also has applications that can assist sighted users explore real world environments using spatial sound information and/or mixed reality displays.

BACKGROUND OF THE INVENTION

A significant proportion of the population is visually impaired or blind. Navigation through unfamiliar environments is a challenge for people with visual impairments that is often ameliorated by the use of canes and/or the assistance of guide dogs. Various attempts have been made to utilize technology to provide additional assistance from simple devices such as ultrasonic canes to more complex devices that attempt to provide navigation guidance.

A number of head-mounted devices, such as headsets and headbands, have been developed for reading and travel assistance for the blind. Head-mounted devices possess the advantage that the ears, which are the only sensory organ responsible for hearing and the main substitution pathway for the blind, are located on the head. An early head-mounted navigation aid was the Binaural Sonic Aid (SonicGuide), which included an ultrasonic wide-beam range sensor mounted on spectacle lenses as shown in FIG. 1. Signals reflected back from real world objects were presented to the user as audio indicating the presence of an obstacle and its approximate distance to the user. Over the years, SonicGuide has been improved and the latest version of the system called KASPA creates an auditory representation of the objects ahead of the user. With sufficient training, KASPA enables users to distinguish different objects and even different surfaces in the environment.

The Sonic PathFinder, developed by Perceptual Alternatives, is a head-mounted system that employs five ultrasonic transducers to measure distance to objects. The system uses the notes of a musical scale to provide warning of objects, where the musical scale descends with each note representing a distance of approximately 0.3 m. Objects picked up from the left or right of the user are heard in the left and right ears respectively. Those straight ahead are heard in both ears simultaneously.

Another approach involved the use of optical sensing to capture environmental information. The vOICe Learning Edition video sonification software available at www.seeingwithsound.com enables the rendering of video images into auditory sound scapes.

The Intelligent Glasses (IG) is a combined head-mounted display and tactile display system developed at Paris 6 University in France. The IG provides tactile maps of visual spaces and allows users to deduce possible paths for navigation through these spaces. The IG includes a pair of stereo-cameras mounted on a glasses frame. The input image data is provided to vision algorithms that identify obstacles in the scene. The locations of the objects is then communicated via a tactile display. The resulting tactile map is a simple edge-like representation of the obstacles' locations in the scene.

A number of GPS based navigation systems have been developed. GPS-based navigation systems are a true orientation aid, as the satellites provide constantly updated position information. A limitation of GPS based navigation systems is that they typically cannot be used to reliably perform indoor navigation.

SUMMARY OF THE INVENTION

Systems and methods in accordance with various embodiments of the invention enable spatial exploration assisted by spatial sound. In many embodiments, spatial sound generated by a spatial exploration system can enable a visually impaired user to explore her or his surrounding environment. In a number of embodiments, exploration enabled by announcing the presence of real world objects using spatial sounds that assist with localization of the object. In several embodiments, exploration is enabled using a virtual guide that provides direction using spatial sound. Spatial exploration systems in accordance with many embodiments of the invention are designed for use by sighted users and include mixed reality displays to enable display of 3D objects including (but not limited to) a 3D virtual guide, 3D objects annotating real world features, and/or 3D objects constituting user interface affordances enabling the generation of spatial sound.

One embodiment of the invention includes: a sensor system; a speaker system comprising at least a left output channel, and a right output channel; a processor; and memory containing a spatial exploration application. In addition, execution of the spatial exploration application by the processor directs the processor to: acquire sensor data using the sensor system; construct a 3D spatial model of a surrounding real world environment using at least acquired sensor data; instantiate a 3D object at a location within the 3D spatial model corresponding to the location of a feature within the surrounding real world environment, where the 3D object includes an audio label containing data describing the feature; determine a location and orientation of a user within the 3D spatial model using at least acquired sensor data; generate an audio clip containing vocalized information describing the feature generated using the audio label of the 3D object; and output a spatial sound describing the identified feature by modifying the audio clip based upon the position of the 3D object relative to the location and orientation of the user within the 3D spatial model to encode audio cues as to the location of the feature in the surrounding real world environment.

In a further embodiment, execution of the spatial exploration application by the processor further directs the processor to: identify a location of a real world feature present within the surrounding real world environment using at least acquired sensor data; and instantiate a 3D object at a location within the 3D spatial model corresponding to the location of the identified feature.

In another embodiment, the feature is at least one feature selected from the group consisting of an object, a person, and a structure.

A still further embodiment also includes a network interface. In addition, execution of the spatial exploration application by the processor further directs the processor. to retrieve information describing an object present within the real world environment and the location of the object within the real world environment via the network interface. Furthermore, instantiating a 3D object at a location within the 3D spatial model includes instantiating a 3D object at a location within the 3D spatial model corresponding to the location contained in the retrieved information describing an object obtained via the network interface.

In still another embodiment, execution of the spatial exploration application by the processor further directs the processor to retrieve information describing an object present within the real world environment using acquired sensor data describing at least one source of information selected from the group consisting of bar codes, QR codes, and/or wireless data transmissions.

A yet further embodiment also includes a network interface. In addition, execution of the spatial exploration application by the processor further directs the processor to: retrieve information describing a feature likely to be present within the real world environment; identify a location of the feature described in the retrieved information within the real world feature environment using at least acquired sensor data; and instantiate a 3D object at a location within the 3D spatial model corresponding to the location of the identified feature.

Yet another embodiment also includes a network interface. In addition, execution of the spatial exploration application by the processor further directs the processor to retrieve a map describing the surrounding real world environment via the network interface.

In a further embodiment again, the map includes at least one map selected from the group consisting of a floor plan and a 3D spatial model.

In another embodiment again, execution of the spatial exploration application by the processor further directs the processor to perform localization relative to the map using at least acquired sensor data.

In a further additional embodiment, execution of the spatial exploration application by the processor further directs the processor to: form a list of 3D objects, where each 3D object in the list of 3D objects includes an audio label containing data describing the feature; generate an audio clip containing vocalized information describing the identified feature generated using the audio label of each 3D object in the list of 3D objects; and output spatial sound announcing the list of 3D objects by modifying the audio clips generated using the audio labels of each of the 3D objects in the list of 3D objects based upon the position of the 3D object relative to the location and orientation of the user within the 3D spatial model to encode audio cues as to location.

In another additional embodiment, execution of the spatial exploration application by the processor further directs the processor to output spatial sound to announce the list of 3D objects in a predetermined order that assists with understanding a spatial relationship between features of the real world environment.

In a still yet further embodiment, execution of the spatial exploration application by the processor further directs the processor to output spatial sound in the form of auditory affordances that alert the user to a location of a real world feature for which a vocalized description is available.

In still yet another embodiment, execution of the spatial exploration application by the processor further directs the processor to: construct a 3D spatial model of a surrounding real world environment using at least acquired sensor data by: constructing an initial 3D mesh using at least acquired sensor data; detecting semantic information concerning the surrounding real world environment using at least acquired sensor data; and refining the initial 3D mesh based upon the detected semantic information concerning the surrounding real world environment.

In a still further embodiment again, the audio label of the 3D object is text data; and execution of the spatial exploration application by the processor further directs the processor to generate an audio clip containing vocalized information describing the feature generated using the audio label of the 3D object using a text-to-speech conversion process.

In still another embodiment again, execution of the spatial exploration application by the processor further directs the processor to modify the audio clip by modulating the pitch of the sound based upon the position of the 3D object relative to the location and orientation of the user within the 3D spatial model to encode audio cues as to the location of the feature in the surrounding real world environment.

A still further additional embodiment further comprises a mixed reality display. In addition, execution of the spatial exploration application by the processor further directs the processor to display the 3D object.

Still another additional embodiment includes: a sensor system; a speaker system comprising at least a left output channel, and a right output channel; a processor; and memory containing a spatial exploration application. In addition, execution of the spatial exploration application by the processor directs the processor to: acquire sensor data using the sensor system; construct a 3D spatial model using at least acquired sensor data; determine a location and orientation of a user within the 3D spatial model using at least acquired sensor data; determine a path through the 3D spatial model; instantiate a 3D guide avatar at a location within the 3D spatial model. Furthermore, execution of the spatial exploration application by the processor directs the processor to repeatedly: determine updated locations and orientations of the user within the 3D spatial model using at least acquired sensor data; determine updated locations of the 3D guide avatar with the 3D spatial model relative to the determined path through the 3D spatial model based upon the updated locations and orientations of the user; and generate spatial sound based upon the position of the 3D guide avatar relative to the location and orientation of the user within the 3D spatial model, where the spatial sound is generated by modifying at least one audio clip to produce audio outputs on the left and right audio channels that simulate a sound originating at a location in the real world corresponding to the location of the 3D guide avatar within the 3D spatial model.

A yet further embodiment again, also includes a mixed reality display. In addition, execution of the spatial exploration application by the processor further directs the processor to display the 3D guide avatar.

In yet another embodiment again, execution of the spatial exploration application by the processor further directs the processor to animate the 3D guide avatar based upon the determined updated locations of the 3D guide avatar with the 3D spatial model.

In a yet further additional embodiment, execution of the spatial exploration application by the processor further directs the processor to instantiate the 3D guide avatar at a location within the 3D spatial model that is slightly offset relative to the heading of the user.

In yet another additional embodiment, execution of the spatial exploration application by the processor further directs the processor to determine that at least one of an updated location and updated orientation of the user meets a criterion and generate a spatial sound including a vocalized navigation direction.

A further additional embodiment again also includes a network interface. In addition, execution of the spatial exploration application by the processor further directs the processor to retrieve a map describing the surrounding real world environment via the network interface.

In another additional embodiment again, the map comprises at least one map selected from the group consisting of a floor plan and a 3D spatial model.

In a sill yet further embodiment again, execution of the spatial exploration application by the processor further directs the processor to perform localization relative to the map using at least acquired sensor data.

In still yet another embodiment again, execution of the spatial exploration application by the processor further directs the processor to determine a path through the 3D spatial model by placing waypoints along a route determined using the map.

In a still yet further additional embodiment, execution of the spatial exploration application by the processor further directs the processor to: identify a location of a real world feature present within the surrounding real world environment using at least acquired sensor data; and instantiate a 3D object at a location within the 3D spatial model corresponding to the location of the identified feature.

In still yet another additional embodiment, the feature is at least one feature selected from the group consisting of an object, a person, and a structure.

A still further additional embodiment again also includes a network interface. In addition, execution of the spatial exploration application by the processor further directs the processor to: retrieve information describing a feature likely to be present within the real world environment; identify a location of the feature described in the retrieved information within the real world feature environment using at least acquired sensor data; and instantiate a 3D object at a location within the 3D spatial model corresponding to the location of the identified feature.

In still another additional embodiment again, execution of the spatial exploration application by the processor further directs the processor to: form a list of 3D objects, where each 3D object in the list of 3D objects includes an audio label containing data describing the feature; generate an audio clip containing vocalized information describing the identified feature generated using the audio label of each 3D object in the list of 3D objects; and output spatial sound announcing the list of 3D objects by modifying the audio clips generated using the audio labels of each of the 3D objects in the list of 3D objects based upon the position of the 3D object relative to the location and orientation of the user within the 3D spatial model to encode audio cues as to location.

In a yet further additional embodiment again, execution of the spatial exploration application by the processor further directs the processor to output spatial sound to announce the list of 3D objects in a predetermined order that assists with understanding a spatial relationship between features of the real world environment.

In yet another additional embodiment again, execution of the spatial exploration application by the processor further directs the processor to output spatial sound in the form of auditory affordances that alert the user to a location of a real world feature for which a vocalized description is available.

In another further embodiment, execution of the spatial exploration application by the processor further directs the processor to: construct a 3D spatial model of a surrounding real world environment using at least acquired sensor data by: constructing an initial 3D mesh using at least acquired sensor data; detecting semantic information concerning the surrounding real world environment using at least acquired sensor data; and refining the initial 3D mesh based upon the detected semantic information concerning the surrounding real world environment.

In still another further embodiment, execution of the spatial exploration application by the processor further directs the processor to modifying the audio clip by modulating the pitch of the sound based upon the position of the 3D object relative to the location and orientation of the user within the 3D spatial model to encode audio cues as to the location of the feature in the surrounding real world environment.

In yet another further embodiment, the audio label of the 3D object is text data; and execution of the spatial exploration application by the processor further directs the processor to generate an audio clip containing vocalized information describing the feature generated using the audio label of the 3D object using a text-to-speech conversion process.

In another further embodiment again, execution of the spatial exploration application by the processor further directs the processor to: instantiate a 3D collision perimeter object within the 3D spatial model in a location determined based upon the location and orientation of a user within the 3D spatial model; repeatedly determine updated locations of the 3D collision perimeter object within the 3D spatial model based upon the updated locations and orientations of the user; and determine that a surface of the 3D collision perimeter object is contacting a surface within the 3D spatial model at a point of contact and generate a spatial sound encoding the point of contact.

In another further additional embodiment, execution of the spatial exploration application by the processor further directs the processor to reduce the size of the 3D collision perimeter object in response to an updated location and orientation of the user based upon continued contact between the surface of the 3D collision perimeter object and the surface within the 3D spatial model.

In still yet another further embodiment, execution of the spatial exploration application by the processor further directs the processor to increase the size of the 3D collision perimeter object in response to an updated location and orientation of the user based upon a determination that the surface of the 3D collision perimeter object no longer contacts the surface within the 3D spatial model that formed the point of contact.

In still another further embodiment again, execution of the spatial exploration application by the processor further directs the processor to: instantiate the 3D collision perimeter object within the 3D spatial model in a location determined based upon the location, orientation, and speed of the user within the 3D spatial model; and repeatedly determine updated locations and shapes of the 3D collision perimeter object within the 3D spatial model based upon the updated locations, orientations, and speeds of the user.

Still another further additional embodiment also includes a user input device. In addition, execution of the spatial exploration application by the processor further directs the processor to: receive a user input via the user input device; and generate spatial sound based upon the position of the 3D guide avatar relative to the location and orientation of the user within the 3D spatial model in response to receipt of the user input via the user input device.

BRIEF DESCRIPTION OF THE DRAWINGS

The patent of application file contains at least one drawing executed in color. Copies of this patent or patent application publication with color drawing(s) will be provided by the Office upon request and payment of the necessary fee.

FIGS. 3A-3C conceptually illustrate the construction of a 3D spatial model corresponding to a real world environment.

FIGS. 20A-20L present experimental results observed when visually impaired users performed three different tasks with the simulated assistance of a spatial exploration system in accordance with an embodiment of the invention.

DETAILED DESCRIPTION

Figure 1:
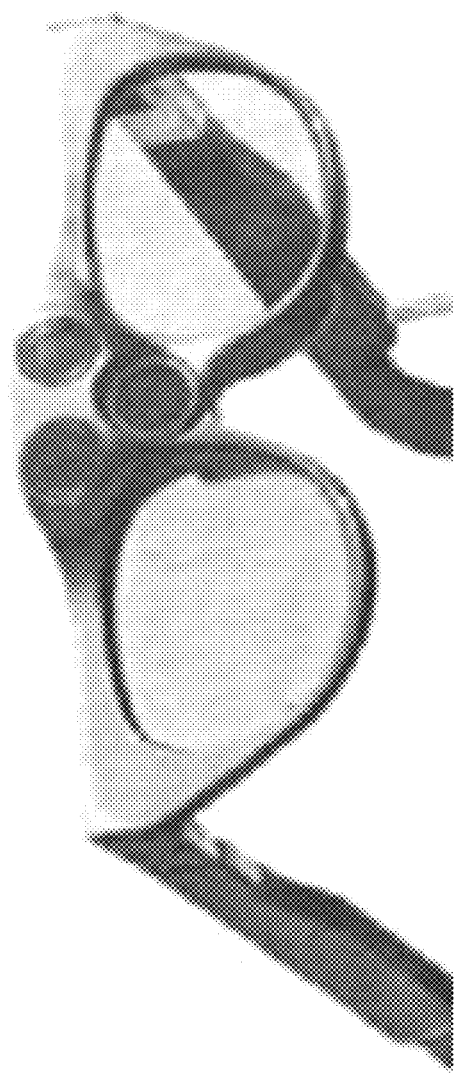
FIG. 1 is a photograph of the SonicGuide head-mounted navigation aid.
Figure 2A:
FIGS. 2A and 2B conceptually illustrate the audio annotation of objects within a scene.
Figure 2B:

Turning now to the drawings, spatial exploration systems and methods for generating spatial sound information relevant to real-world environments in accordance with various embodiments of the invention are illustrated. Spatial exploration systems in accordance with many embodiments of the invention represent real-world environments using 3D spatial models. These 3D spatial models are data structures that describe the 3D structure of the surrounding environment, which are dynamically updated by processors within the spatial exploration systems. Spatial exploration systems can place 3D objects within the 3D spatial models and can utilize the 3D objects generate spatial audio information concerning the environment. In the discussion that follows, the terminology "3D" is used to refer to a computer-generated representation that is stored in the memory of a computer system as opposed to a real world structure or object. In certain embodiments, the 3D objects annotate real world objects within in a scene (e.g. they occupy corresponding locations but have different shapes) and include audio labels that can be used to generate spatial audio information describing the annotated real world object. Placement of 3D objects including audio labels describing real world objects within a 3D spatial model in locations corresponding to the locations of real world objects in accordance with an embodiment of the invention is conceptually illustrated in FIGS. 2A and 2B. In various embodiments, the spatial audio information is a series of spatial navigation cues that enable navigation through the real world environment. The use of virtual guides to provide automated navigation services using spatial exploration systems is discussed in detail below.

Humans utilize differences in the sound received at each ear to determine the direction and distance to an audio source. Delays between when sound reaches each ear and/or amplitude differences can provide left or right audio cues. Up and down cues can be obtained from spectral changes produced by the outer ear shape. Spatial exploration systems in accordance with several embodiments of the invention possess the ability to generate spatial sound. The term spatial sound refers to sounds that are synthesized to create a perception that the sound originated at a particular spatial location. In a number of embodiments, spatial sounds are generated by synthesizing (at least) left and right audio channels that create the perception of sound emanating from a real world location corresponding to the location of the 3D object within the 3D spatial model. As can readily be appreciated, spatial sound can be generated using any of a variety of techniques appropriate to the requirements of a given application.

The ability to generate spatial sound can enable a spatial exploration system to encode direction and/or location information in audio signals used to convey additional vocalized information. The term vocalized information can be used to refer to synthetic speech and can be distinguished from other sounds that do not convey information using synthesized speech. As is discussed further below, vocalized information conveyed by spatial exploration systems can include audio labels describing objects. Conveying the audio labels as spatial sound implicitly encodes the location of the object described in the audio label.

Spatial exploration systems in accordance with many embodiments of the invention can generate vocalized information containing vocalized navigation instructions that implicitly encode additional directional navigation information. As can readily be appreciated, generating spatial sound from the location of a virtual guide leading a user encodes fine grained directional information in more general vocalized instructions such as (but not limited to) "turn left". The encoding of direction and/or location information in vocalized information using spatial exploration systems in accordance with various embodiments of the invention is discussed in detail below.

While much of the discussion that follows involves the presentation of audio information to visually impaired users of spatial exploration systems, a person of ordinary skill in the art will readily appreciate that systems and methods in accordance with many embodiments of the invention can be utilized to provide information via audio and/or mixed reality displays. Indeed, spatial exploration systems in accordance with many embodiments of the invention can be utilized to provide indoor navigation using a mixed reality display to insert a virtual 3D guide avatar within the field of view of a sighted wearer and speakers to provide spatial sound prompts that are perceived by the wearer as emanating from the 3D guide avatar. Spatial exploration systems and methods for generating spatial sound information relevant to real world environments in accordance with various embodiments of the invention are discussed further below.

Spatial Exploration

In many embodiments, the spatial exploration system utilizes a process to enable exploration of the environment surrounding a user that commences by obtaining a 3D spatial model of the surroundings. The spatial model enables the spatial exploration system to understand the structure of its real-world environment. The spatial exploration system can then assist the user to move through the environment and/or detect people, objects and/or other structures of interest within the environment and alert the user to their presence using vocalized information. In several embodiments, the spatial exploration system generates a 3D spatial model using a machine vision system. In a number of embodiments, the spatial exploration system utilizes floor plans and/or previously generated 3D spatial models to assist with understanding the 3D structure of the surrounding environment.

Figure 3A:
Figure 3C:
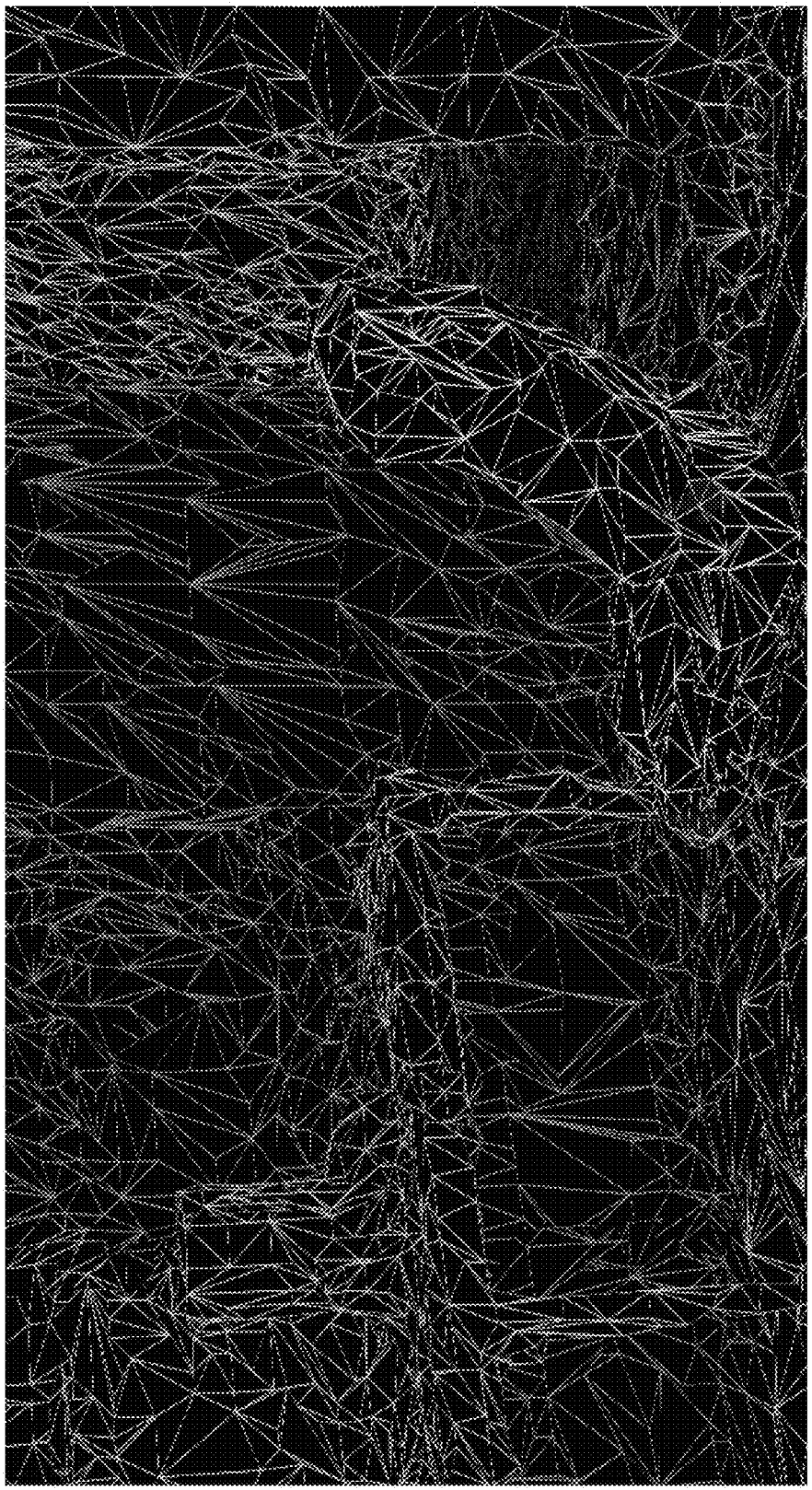

A process for generating a 3D spatial model of an environment is conceptually illustrated in FIGS. 3A-3C. FIG. 3A is a photograph of a laboratory environment. FIG. 3B illustrates a 3D mesh generated using image and/or depth information captured by a spatial exploration system in accordance with an embodiment of the invention. The resulting 3D spatial model formed by the 3D mesh is illustrated in FIG. 3C and the correspondence between the 3D spatial model and the real world can be appreciated from FIG. 3B.

Figure 3D:
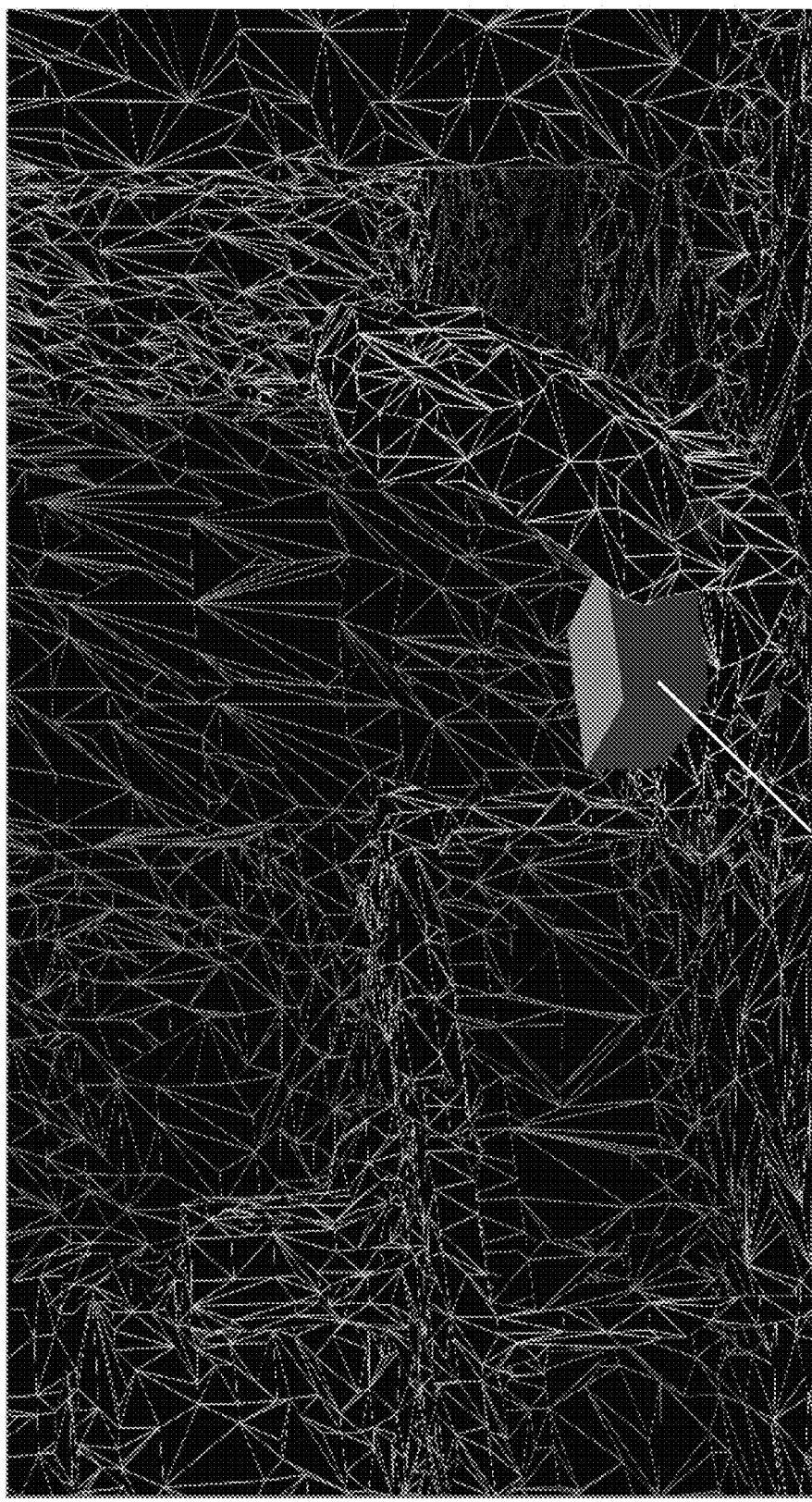
FIGS. 3D and 3E conceptually illustrates the insertion of 3D objects into a 3D spatial model, where the 3D objects correspond to real world objects within the scene described by the 3D spatial model and include audio labels describing the real world objects, in accordance with an embodiment of the invention.
Figure 3E:
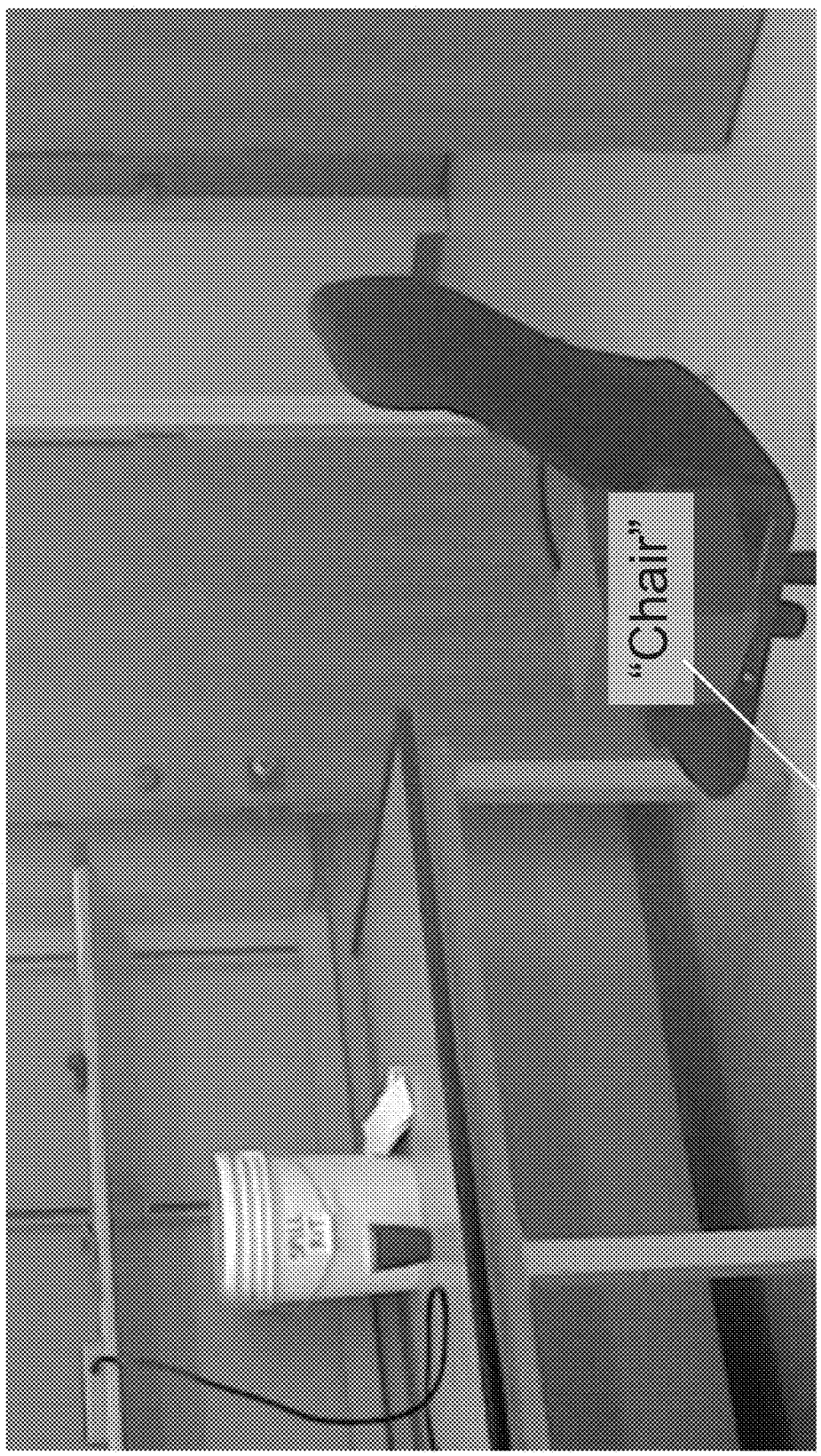

Once a spatial exploration system has obtained a 3D spatial model, the spatial exploration system can use raw sensor inputs and/or the 3D spatial model to obtain information concerning features of the real world environment such as (but not limited to) specific people, objects and/or structures present within the real world environment. In a number of embodiments, spatial exploration systems perform face detection and recognition, and/or object detection and classification. In other embodiments, any of a variety of processes appropriate to the requirements of a given application can be utilized to identify semantic information within a scene relevant to a user. When a person and/or object is detected within the real-world environment, spatial exploration systems in accordance with many embodiments of the invention can instantiate a 3D object corresponding to a feature of the real world environment at a corresponding location within the 3D spatial model of the real world environment. The instantiation of a 3D object 310 within the spatial model shown in FIG. 3C corresponding to the chair visible within the scene captured in FIG. 3A is conceptually illustrated in FIG. 3D. The correspondence between the location of the 3D object 310 corresponding to the chair within the 3D spatial model and the actual location of the chair within the real world can be appreciated from FIG. 3E, which simulates the display of the 3D object via a mixed reality display from the viewpoint of a user. In many embodiments, audio labels are associated with the 3D object and the audio labels can be utilized by spatial exploration systems to convey spatial sound information to a user. The application of an audio label that describes the 3D object as a "chair" is conceptually illustrated in FIG. 3E. As is discussed in detail below, the spatial exploration system can utilize information such as (but not limited to) the pose and/or viewpoint of the user to generate spatial sound vocalizing the audio labels of 3D objects within a specific field of view. As can readily be appreciated, encoding location using spatial sound enables the user to determine the locations of real world objects being described by the vocalized information generated by the spatial exploration system.

In many instances, specific objects are persistent within real-world environments. Accordingly, spatial exploration systems in accordance with a number of embodiments of the invention can retrieve information concerning objects present within an environment and their locations and can use this information to instantiate corresponding 3D objects within the 3D spatial model of the real-world environment.

Furthermore, people, objects and/or structures within an environment can communicate information describing themselves using any of a variety of modalities including (but not limited to) bar codes, QR codes, and/or wireless data transmissions. Accordingly, spatial exploration systems in accordance with many embodiments of the invention can fuse information concerning the surrounding environment retrieved from a variety of sources and can dynamically update the data structures describing the 3D spatial model and 3D objects within the 3D spatial model that is maintained within the memory of the spatial exploration system throughout the exploration of an environment.

In many embodiments, spatial exploration systems utilize a 3D spatial model of a real-world environment to provide spatial audio information to assist with navigation. In several embodiments, a 3D guide avatar is placed within the 3D spatial model and is controlled to move through the 3D spatial model in a manner that is responsive to the location and orientation of the spatial exploration system. Placement of a 3D guide avatar 320 within the spatial model shown in FIG. 3C in accordance with an embodiment of the invention is conceptually illustrated in FIG. 3F. The position of the 3D guide avatar within the 3D spatial model enables spatial sound emanating from the 3D guide avatar to provide spatial navigation cues as to the direction in which a user should travel. In certain embodiments, the 3D guide avatar continuously generates spatial navigation cues such as footsteps, and/or singing or whistling a tune. In many embodiments, the 3D guide avatar can issue spatial navigation cues in the form of vocalized instructions directing the user to, for example, "turn left", "turn right", "go up stairs", "go down stairs", and/or "turn around". In a mixed reality context, a wearer of a spatial exploration system typically has a limited field of view and spatial sound emanating from the location of a 3D guide avatar can enable rapid localization of the 3D guide avatar when the 3D guide avatar is not visible within the user's field of view. The display of the 3D guide avatar 320 shown in FIG. 3F by a mixed reality display is conceptually illustrated in FIG. 3G. The use of virtual guides to provide navigation services using spatial exploration systems using spatial sound and/or mixed reality displays is discussed further below.

While various spatial exploration modalities are described above with reference to FIGS. 3A-3G, it should be appreciated that any of a number of different spatial exploration processes can be performed using spatial exploration systems as appropriate to the requirements of a given application in accordance with various embodiments of the invention. Spatial exploration systems in accordance with a number of embodiments of the invention are discussed further below.

Spatial Exploration Systems

Spatial exploration systems in accordance with various embodiments of the invention can take on a variety of forms depending upon the requirements of specific applications. In a simple form, a spatial exploration system can include speakers to generate spatial sound and sensors that are capable of performing Simultaneous Localization and Mapping (SLAM) using beacons and/or other RF sources (e.g. a WiFiSLAM system) and/or using other indoor localization techniques including (but not limited to) localization using active and/or passive RFID tags. More complex spatial exploration systems can use sensors that capture visual and/or depth information that can be utilized when performing SLAM (e.g. VSLAM or LSD-SLAM). In a number of embodiments, SLAM can be performed using multiple imaging modalities including (but not limited to) near-IR and visible light. The ability to perform SLAM can enable a spatial exploration system to locate itself within a map of the surrounding environment and/or build a map of the surrounding environment. In many embodiments, a map is available and/or mapping is performed on a remote server system and the spatial exploration system performs localization using map data retrieved from the remote server. As can readily be appreciated, any of a variety of functions can be distributed computing hardware local to a user and a remote computing system connected via a network such as (but not limited to) the Internet as appropriate to the requirements of a given application in accordance with various embodiments of the invention.

Spatial exploration systems in accordance with a number of embodiments of the invention can also include a variety of output modalities in addition to audio outputs including (but not limited to) virtual reality displays and/or mixed reality displays. Spatial exploration systems in accordance with many embodiments of the invention can also include network interfaces to enable information exchange with remote servers and/or other spatial exploration systems. A number of spatial exploration systems in accordance with specific embodiments of the invention are discussed further below.

Figure 4:
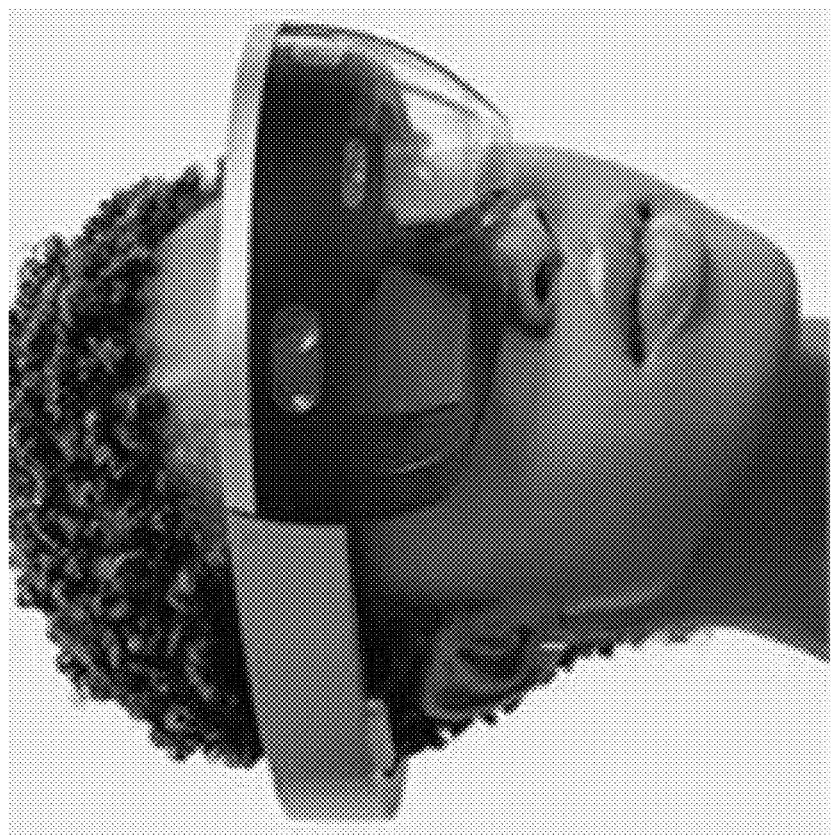
FIG. 4 is a photograph showing the Microsoft Hololens mixed reality smartglasses manufactured by Microsoft Corporation of Redmond Washington.

A Microsoft Hololens head-mounted mixed reality headset that can be configured as a spatial exploration system to provide spatial audio information concerning a user's environment and to provide an automated audio and/or mixed reality (indoor) navigation service in accordance with an embodiment of the invention is illustrated in FIG. 4. The Microsoft Hololens includes a number of sensor systems including an inertial measurement unit (IMU), and a depth camera. The IMU includes an accelerometer, gyroscope, and a magnetometer. In order to process data captured by the depth camera and IMU, the Microsoft Hololens incorporates a microprocessor and a holographic processing unit. The Microsoft Hololens includes built-in speakers that can provide audio information to wearers and see-through holographic lenses that enable the display of what Microsoft refers to as holograms to create a mixed reality experience for a user. While the holographic lenses may not be particularly relevant to visually impaired users of systems in accordance with various embodiments of the invention, mixed reality displays such as (but not limited to) the holographic lenses incorporated within the Microsoft Hololens are utilized in systems in accordance with many embodiments of the invention intended for use with sighted users and that display avatars during indoor navigation guidance.

In many embodiments, a Microsoft Hololens is configured using the Microsoft Windows 10 operating system upon which the Unity game engine for HoloLens is installed. Unity is a cross-platform game engine developed by Unity Technologies that can be utilized by the spatial exploration system to build 3D spatial models in which 3D objects can be instantiated. In certain embodiments, the spatial exploration system uses the HoloToolkit for Unity distributed by Microsoft Corporation to build 3D spatial models using sensor data captured by the Microsoft Hololens during exploration of an environment. In certain embodiments, the HoloToolkit SpatialMapping prefab is used for handling spatial mapping and rendering. In a number of embodiments, the Holotoolkit SpatialUnderstanding prefab is utilized to generate a refined mesh in which semantic information concerning the scene such as (but not limited to) surfaces that are associated with ceilings, floors, and walls can be utilized to simplify the initially generated 3D mesh (see e.g. FIG. 3H). As discussed further below, scene understanding can be utilized to guide detection of features within the scene and/or placement of waypoints for the purpose of navigation. In many embodiments, computer vision processes can be utilized to annotate objects detected within images captured by the spatial exploration system. In a number of embodiments, the Vuforia SDK v6.1.17 distributed by PTC Inc. of Boston, Mass. can be utilized to enable real time recognition and tracking of a predefined set of target objects. The use of the Vuforia SDK enables the tracking of both static and dynamic objects using the Microsoft Hololens. The use of the Vuforia SDK to detect a rest room sign and the addition of a 3D object within a 3D spatial model to annotate the corresponding location of the rest room is conceptually illustrated in FIGS. 12A-12C, which are discussed further below.

In a number of embodiments, sound spatialization is performed using a Unity plug-in named Microsoft HRTF Spatializer distributed by Microsoft Corporation. Text-to-speech conversion can be achieved using the TextToSpeech-Manager within the HoloToolkit, which generates audio clips that can be associated with the location of the object label being called out to make it possible for localization of the latter through spatialized sound cues.

As can readily be appreciated, the manner in which a mixed reality platform such as (but not limited to) the Microsoft Hololens, and/or a specific hardware platform is configured to implement a spatial exploration system in accordance with an embodiment of the invention typically depends upon the requirements of a given application. Various alternative configurations to the Microsoft Hololens are discussed below with reference to FIG. 5.

Figure 5:
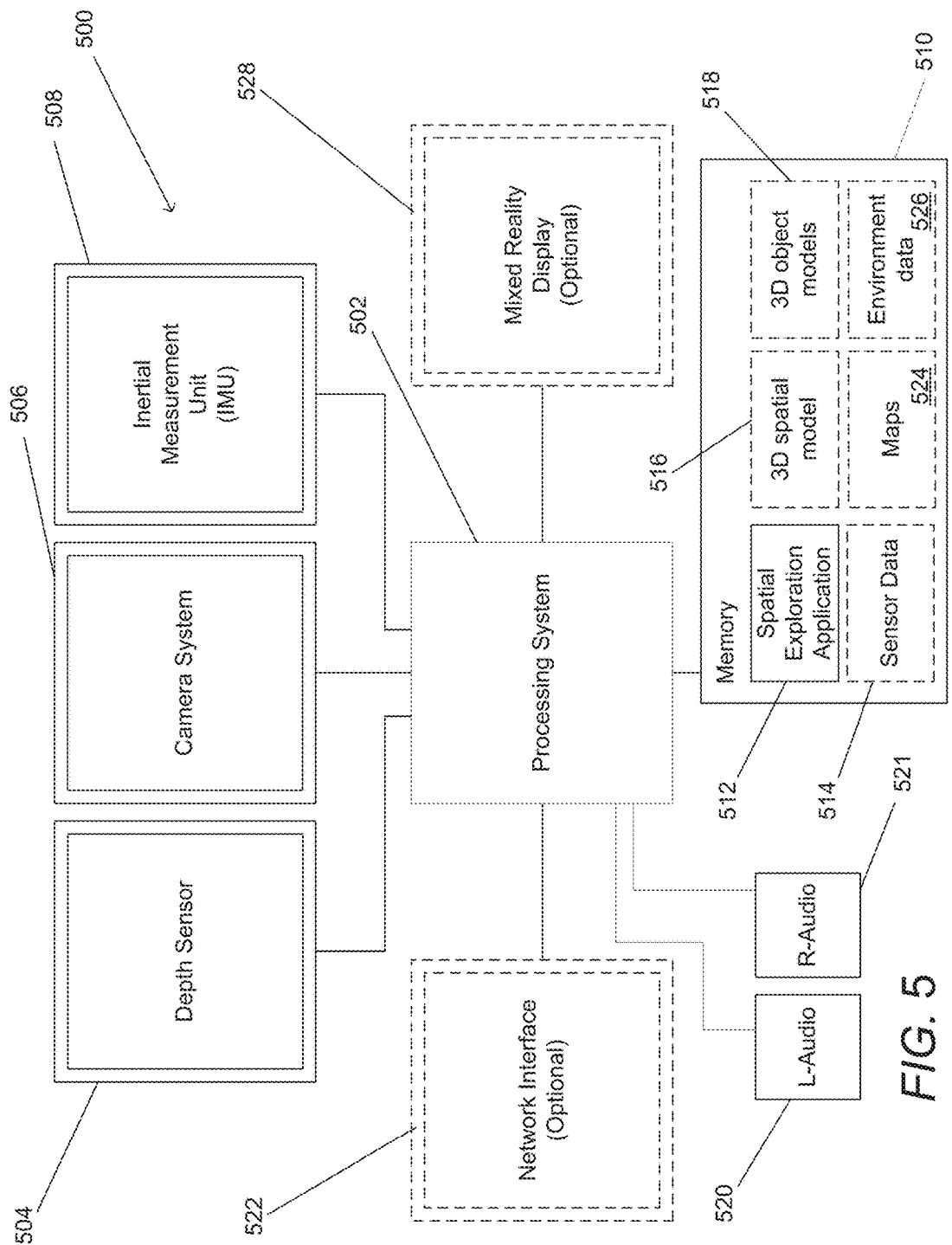
FIG. 5 conceptually illustrates components of a spatial exploration system in accordance with an embodiment of the invention.

A spatial exploration system incorporating a variety of sensors that can be utilized to perform SLAM in accordance with an embodiment of the invention is illustrated in FIG. 5. The spatial exploration system 500 includes a processing system 502 configured to process sensor data received from an array of sensors. The processing system or processor 502 can be implemented using one or more microprocessors, graphics processing units, image signal processors, machine vision processors, and/or custom integrated circuits developed in order to implement the spatial exploration system 500. In the illustrated embodiment, the sensors include a depth sensor 504, a camera system 506, and an inertial measurement unit 508. While specific sensor systems are described below, any of a variety of sensors can be utilized to perform localization and to determine pose of a user (e.g. determine head position and orientation) as appropriate to the requirements of a given application.

Referring again to FIG. 5, the depth sensor 504 can take the form of one or more stereo camera pairs (optionally enhanced by projected texture), a structured illumination system and/or a time of flight camera. In certain embodiments, the depth sensor 504 can be a LIDAR system. As can readily be appreciated, any of a variety of depth sensor systems can be incorporated within a spatial exploration system as appropriate to the requirements of a given application in accordance with various embodiments of the invention.

In many embodiments, the camera system 506 includes a single RGB camera. In several embodiments, the camera system includes multiple cameras with different color filters and/or fields of view. In certain embodiments, the camera system includes an RGB camera with a narrow field of view and a monochrome camera with a wide field of view. Color information can be utilized to perform detection of features such as (but not limited to) people, objects and/or structures within a scene. Wide field of view image data can be utilized to perform motion tracking. As can be readily appreciated, the need for a camera system and/or specific cameras included in a camera system utilized within a spatial exploration system in accordance with an embodiment of the invention is typically dependent upon the requirements of a given application.

In the illustrated embodiment, the spatial exploration system 500 includes an inertial measurement unit (IMU) 508 that can provide information concerning the motion of the spatial exploration system. As can readily be appreciated, information generated by the sensors within the IMU can be utilized by the processing system 502 to perform SLAM processes.

The process 502 is configured by software stored within the memory 510 of the spatial exploration system. In the illustrated embodiment, a spatial exploration application 512 coordinates capture of sensor data 514 using the sensor systems. The sensor data 514 is stored in memory 518 and processed by the processing system 502 to generate a 3D spatial model 516. As noted above, the 3D spatial model 516 is described by data structures stored in the memory 510 of the spatial exploration system 500. In many embodiments, these data structures are dynamic and are continuously updated as the spatial exploration system explores a specific environment. In many embodiments, the 3D spatial model includes a 3D mesh that can be represented using any of a variety of data structures that are commonly utilized to represent 3D meshes within the memory of a computer system. In several embodiments, the 3D mesh is utilized to generate a 3D spatial model that describes the real world environment using voxels. In a number of embodiments, the processes utilized to convert the meshes to voxels include processes similar to those described in U.S. Patent Application Serial No. 2016/0008988 entitled "Robotics Platforms Incorporating Manipulators Having Common Joint Designs" and Bajracharya et al., *Real-time 3D Stereo Mapping in Complex Dynamic Environments*, IEEE International Conference on Robotics and Automation—Semantic Mapping, Perception, and Exploration (SPME) Workshop (2012), the disclosure of U.S. Patent Application Serial No. 2016/0008988 and the Bajracharya et al. paper including (but not limited to) the disclosure related to the generation of voxel-based maps based upon depth information is hereby incorporated by reference herein in its entirety.

The sensor data 514 can also be utilized to detect people, objects, and/or structures within scenes captured by the sensor systems. In many embodiments, sensor data captured by multiple modalities (e.g. depth and image data) are utilized to perform detection and/or classification processes. When a person, object, and/or structure is detected, the processing system 502 can instantiate a 3D object and include the 3D object within the 3D spatial model 516. Instantiation of the 3D object can involve creation of 3D object model data 518 that is stored within data structures in memory. The data structures can be dynamic in the sense that 3D objects can move within the 3D spatial model as the corresponding feature moves within the real world. Accordingly, the processing system 502 can continuously update the location and/or other characteristics of a 3D object described by the corresponding data structure maintained by the processing system in memory 510. In many embodiments, the spatial exploration application relies upon a game engine to manage updates to 3D object models. In other embodiments, 3D object models are updated using any technique appropriate to the requirements of a given application.

In many embodiments, the 3D object model data includes audio labels that are utilized by the processing system 502 to generate spatial sound. In the illustrated embodiment, the spatial exploration system includes left and right speakers 520, 521 and the spatial exploration application 512 generates left and right audio channels based upon an audio label of a 3D object to generate a spatial sound. The specific characteristics of the spatial sound are determined based upon the pose of the head of the user relative to the location of the 3D object within the 3D spatial model. In this way, the spatial exploration system can present spatial sound that the user perceives as originating from a location in the real world that corresponds to the location of the 3D object within the 3D spatial model. In many spatial exploration systems, the speakers are head mounted but do not cover the ears to enable the wearer to experience a mixed reality auditory experience in which the user hears both spatial sound generated by the spatial exploration system and natural sound. In several embodiments, a similar effect can be achieved using headphones. As can readily be appreciated, the specific system utilized to generate sound is largely dependent upon the requirements of a given application. In a number of embodiments, additional audio channels are generated by the spatial exploration system and/or different techniques are utilized to generate spatial sound. As can readily be appreciated, the effectiveness with which spatial sound can be generated can be dependent upon the accuracy with which the pose of the user's head can be determined. When the locations of each of the user's ears is accurately represented within the 3D spatial model, then the position of a 3D object will be accurately perceived from the spatial sound generated by the spatial exploration system. Accordingly, spatial exploration systems in accordance with many embodiments of the system incorporate head mounted sensors including (but not limited to) a head mounted IMU to enable precise estimates of head pose for the purposes of generating spatial sound. Generation of spatial sound using spatial exploration systems in accordance with various embodiments of the invention is discussed further below.

In many instances, the spatial exploration system includes a network interface 522. The network interface 522 can be any of a variety of wired and/or wireless interfaces including (but not limited to) a BLUETOOTH wireless interface, and/or a WIFI wireless interface. In several embodiments, the wireless interface 522 can be used to download a floor plan or map 524 of the surrounding environment and can use SLAM to perform localization relative to the map. In certain embodiments, the network interface can also be used to populate a 3D spatial model 516 of the environment with 3D objects 518 based upon information concerning persistent people, objects, and/or structures within the environment. In several embodiments, information describing the environment 526 is retrieved via the network interface concerning people, objects, and/or structures that may be present within a particular environment that enhances the ability of the spatial exploration system to detect the presence and/or location of the specific people, objects and/or structures during spatial exploration of the environment. For example, the spatial exploration system 500 may receive information describing the face of a particular person that can enable the spatial exploration system to compare faces detected within captured images to the face of the particular person to confirm his or her presence and location within the environment. As can readily be appreciated, spatial exploration systems can receive and/or retrieve any of a variety of different types of information via a network interface 522 that can be useful to specific spatial exploration applications as appropriate to the requirements of those applications.

When a spatial exploration system is utilized by a visually impaired user, the primary output modality is spatial sound. Additional output modalities can include (but are not limited to) haptic feedback that can be provided by actuators worn by the user and configured to generate vibration feedback. Spatial exploration systems in accordance with several embodiments of the invention are intended for sighted users. Accordingly, spatial exploration systems can include mixed reality displays 528 that can be utilized to display synthetic or virtual 3D objects within the field of view of a user. For example, many spatial exploration systems utilize mixed reality displays 528 to display 3D virtual guides. The 3D virtual guide can be represented as a 3D object stored as a 3D object model 518 within the memory 510 of the spatial exploration system 510. The spatial exploration application 512 can animate the displayed 3D virtual guide in a manner responsive to sensor data captured by the sensor systems that is indicative of movement of the user and/or within the real world environment (e.g. movement of other objects or people). The manner in which 3D virtual guides are displayed and/or animated is discussed further below.

While a number of specific hardware platforms and/or implementations of spatial exploration systems are described above with reference to FIGS. 4 and 5, any of a variety of hardware platforms and/or implementations incorporating a variety of sensor systems, output modalities, and/or processing capabilities can be utilized as appropriate to the requirements of specific applications in accordance with various embodiments of the invention. Processes that can be utilized by a variety of different spatial exploration systems during the exploration of a specific environment are discussed further below.

Spatial Exploration Processes

Figure 6:
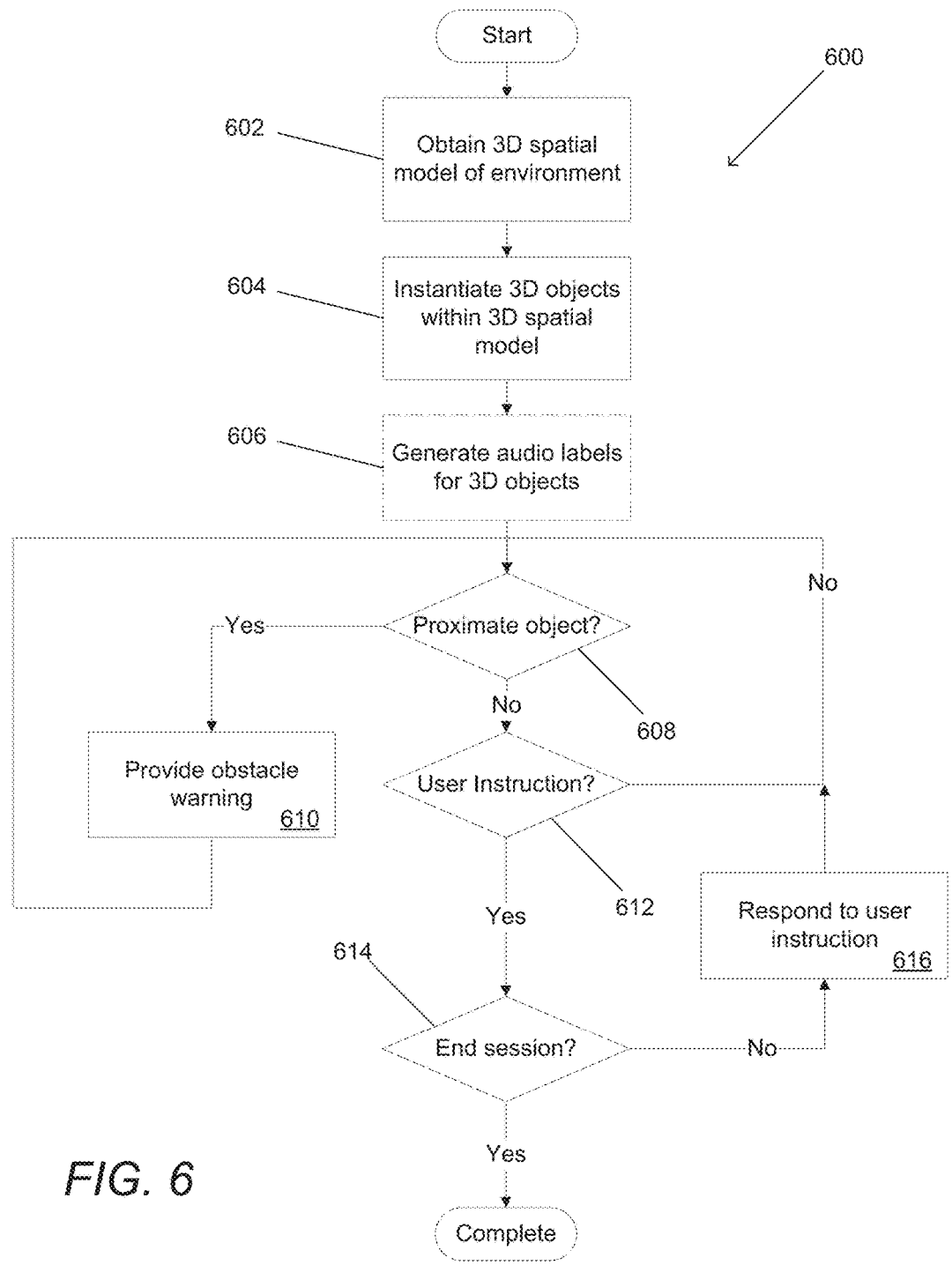
FIG. 6 conceptually illustrates a spatial exploration process performed by a spatial exploration system in accordance with an embodiment of the invention.

Spatial exploration processes in accordance with a number of embodiments of the invention involve the acquisition of a 3D spatial model for the environment and then the generation of spatial sound in response to the needs of the user. A process for performing spatial exploration using a spatial exploration system in accordance with an embodiment of the invention is illustrated in FIG. 6. The process 600 includes obtaining (602) a 3D spatial model of the environment. As noted above, the 3D spatial model can be entirely generated by the spatial exploration system, can be downloaded by the spatial exploration system, and/or generated using a combination of downloaded map information and/or 3D spatial information synthesized from sensor data acquired by the spatial exploration system.

In many embodiments, 3D objects are instantiated (604) during the process 600. As noted above, 3D objects can correspond to features of the real world and/or to synthetic objects such as (but not limited to) a 3D virtual guide. In many embodiments, 3D objects are instantiated based upon the detection of a specific feature (e.g. person, object, and/or structure) within the environment. The detection can be assisted using data describing features likely to be present within a specific environment downloaded by the spatial exploration system. In certain embodiments, 3D objects are instantiated based upon information downloaded by the spatial exploration system that describes 3D objects that are persistent or otherwise known to be present within the environment (e.g. due to another spatial exploration system sharing the location of a recently detected/observed object within the environment). As is discussed further below, the instantiated 3D objects can be utilized during the process 600 to determine the manner in which spatial audio information is presented to the user to assist with exploration of the environment.

In many embodiments, data describing observed features and/or 3D objects is obtained by the spatial exploration system from memory and/or a remote device and the data includes audio labels that can be utilized to generate spatial sound. In many instances, the process 600 (optionally) generates (606) audio labels describing one or more of the instantiated 3D objects. As is discussed further below, the audio labels can be generated using a text to speech process that enables the spatial exploration system to convert text data describing an object into an audio clip that can then be manipulated based upon position of the object relative to the user's head pose to generate spatial sound. Specific processes for generating spatial sound using audio clips are discussed further below.

The 3D spatial model can be utilized within the process 600 to facilitate collision avoidance. When the process determines (608) that the user is proximate to an object and/or structure that is represented within the 3D spatial model, the process can provide (610) an obstacle warning. The obstacle warning can be an audio warning and/or haptic feedback. In many embodiments, audio warnings are spatial sounds. In a number of embodiments, audio warnings are simply alerts. Various processes for providing obstacle warnings that can be utilized in accordance with certain embodiments of the invention are discussed in detail below.

The 3D spatial model constructed during process 600 can be utilized to facilitate spatial exploration. The specific manner in which the spatial exploration system enables exploration of an environment can be directed by the user. When the spatial exploration system determines (612) that the user has provided an instruction, the process responds accordingly. As can readily be appreciated, user instructions are not essential to the operation of the system and, in many embodiments, the system operates autonomously and/or possesses autonomous modes of operation. Spatial exploration systems in accordance with many embodiments of the invention provide a number of different input modalities including (but not limited to) user interface devices (e.g. a clicker or pointing device), 3D gesture detection, and/or voice commands. As can readily be appreciated, any of a variety of input modalities can be utilized by a spatial exploration system as appropriate to the requirements of a given application. Depending upon the specific user input received by the spatial exploration system, the process 600 can enter a number of different spatial exploration modes in response to the user instruction 616.

In a number of embodiments, process 600 supports a "list mode" in which the system generates spatial sound that provides vocalized information describing a list of 3D objects generated using audio labels for the listed 3D objects. In certain embodiments, the manner in which the list of 3D objects is generated can be configured by the user. In many embodiments, the list is all objects visible within a field of view of the user. However, list mode can also be utilized to list all 3D objects within a certain proximity of the user and/or including objects that are outside the field of view of the user. In certain embodiments, the list of objects is generated based upon which of a predetermined set of objects are present within the user's environment (e.g. the system announces doorways and restrooms).

Figure 7A:
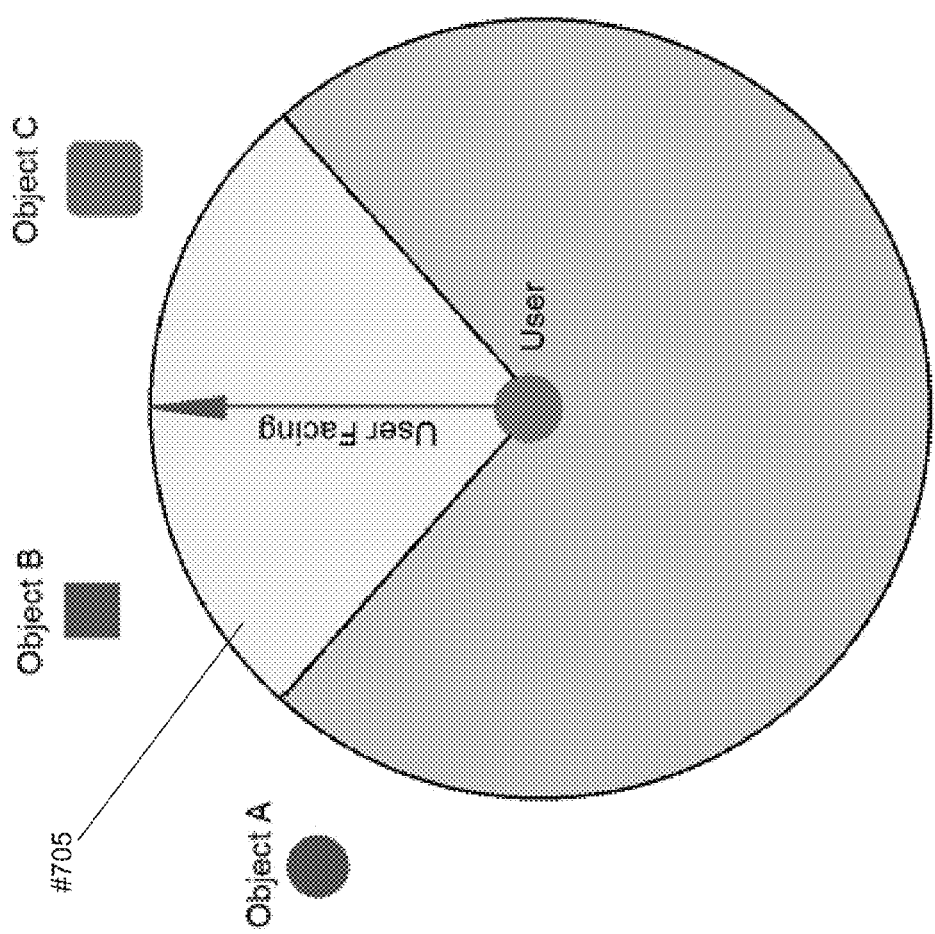
FIG. 7A conceptually illustrates announcement of objects using spatial sound in a "scan mode" performed by a spatial exploration system in accordance with an embodiment of the invention.

In several embodiments, the process 600 supports a "scan mode" in which the system generates spatial sound describing all objects that enter the field of view of a user as the user moves her or his head. In many embodiments, the objects are announced in a predetermined order that assists with understanding the spatial relationship between objects and to form a mental image of a scene. For example, objects can be announced in order from left to right with background objects announced prior to foreground objects. Announcement of an object B followed by an object C using spatial sound encoding direction and/or location in vocalized information describing the objects, where objects B and C are within a field of view 705 of a user, during "scan mode" operation in accordance with an embodiment of the invention is conceptually illustrated in FIG. 7A.

Figure 7B:
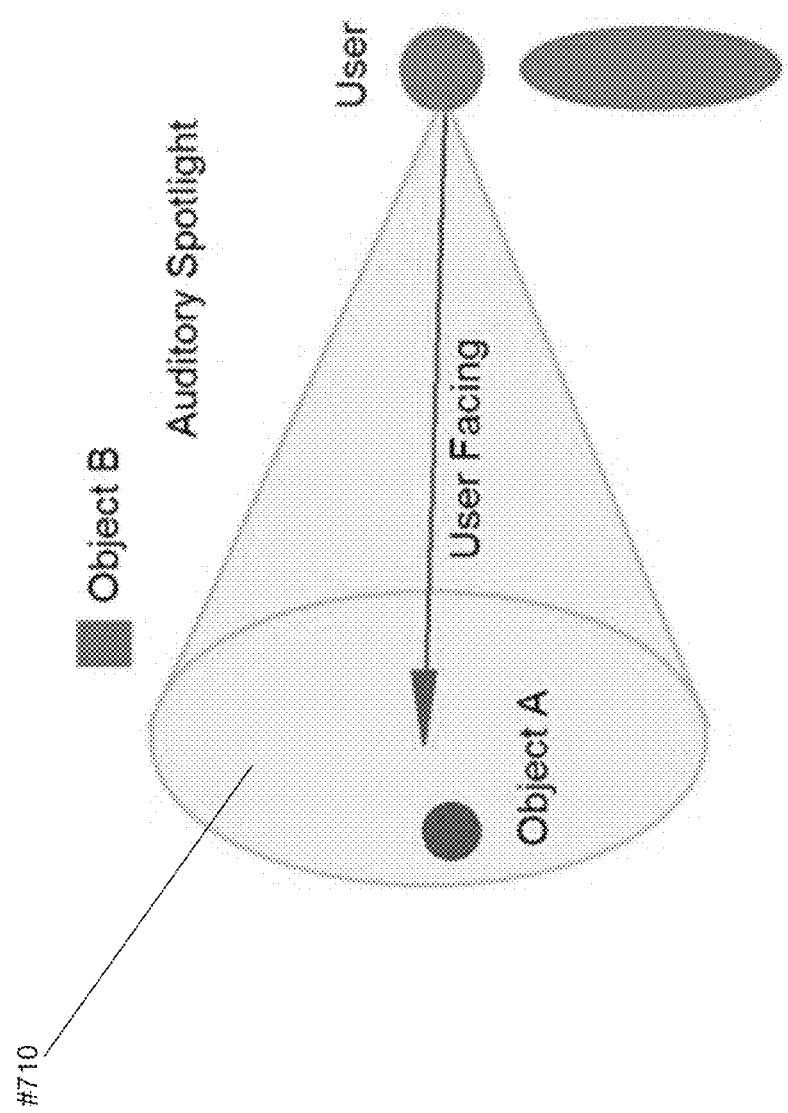
FIG. 7B conceptually illustrates announcement of objects using spatial sound in a "spotlight mode" performed by a spatial exploration system in accordance with an embodiment of the invention.

A particular version of "scan mode" is a "spotlight mode" that can be thought of in a manner similar to a miner's helmet in which all objects "illuminated" by an "auditory spotlight" emanating from a user's head are announced by the spatial exploration system using spatial sound that encodes the location of the object in the vocalized information describing the object. Announcement of an object A that falls within an "auditory spotlight" 710 using spatial sound encoding direction and/or location in vocalized information describing object A during "scan mode" operation in accordance with an embodiment of the invention is conceptually illustrated in FIG. 7B. In a number of embodiments, spatial sound can be generated in the form of auditory affordances that alert the user to the locations of real world features for which a vocalized description is available. In this way, audio affordances can prompt a user to adopt a head pose that causes announcement of an object. In several embodiments, affordances are sonified as white noise, a hum, or any other sonification appropriate to the requirements of a given application.

In certain embodiments, the process 600 supports a "guide mode" in which a user instruction to provide navigation assistance results in the process 600 instantiating a 3D object corresponding to a 3D virtual guide. The 3D virtual guide can provide spatial sound navigation cues to the user and move through the environment generating additional spatial sound cues in a manner that is responsive to movement of the user. In a number of embodiments, the spatial exploration system controls the movement of the 3D guide avatar along a path to constrain the 3D guide avatar to a specific distance and/or range of distances in front of the user. As noted above, the 3D virtual guide can generate continuous spatial sound cues such as vocalized descriptions of proximate objects, footsteps, and/or music. The 3D virtual guide can also issue directions directing the user to, for example, "turn left", "turn right", "go up stairs", "go down stairs", and/or "turn around". Issuing the instruction using spatial sound encodes additional fine grain direction information within the vocalized information. In a mixed reality context, a wearer of a spatial exploration system may have a limited field of view and spatial sound emanating from the location of a 3D guide avatar can enable rapid localization of the 3D guide avatar when the 3D guide avatar is not visible within the user's field of view. In certain embodiments, the spatial exploration system determines when the user has diverged from a navigation path and/or the 3D guide avatar has moved outside the field of view of the user and issues a vocalized direction specifying how the user should orient themselves and/or move in order to return to the path.

As can readily be appreciated, the specific modes supported by a spatial exploration system in accordance with an embodiment of the invention is largely dependent upon the requirements of a given application. When the process 600 receives a user instruction, a determination (614) can be made that the user wishes to end the spatial exploration session, the process 600 completes. In a number of embodiments, the process continuously and/or upon completion stores and/or uploads data describing features of the environment observed during the spatial exploration session that can be utilized in future sessions and/or by other spatial exploration systems.

While specific processes for performing spatial exploration are described above with respect to FIG. 6, any of a variety of processes can be utilized for determining the pose of a user's head and providing spatial sound relevant to a surrounding environment as appropriate to the requirements of a given application in accordance with various embodiments of the invention. Processes for generating 3D spatial models, generating spatial sound, collision avoidance and performing guided navigation that can be utilized by spatial exploration systems in accordance with various embodiments of the invention are discussed further below.

Generating 3D Spatial Models

Figure 3F:
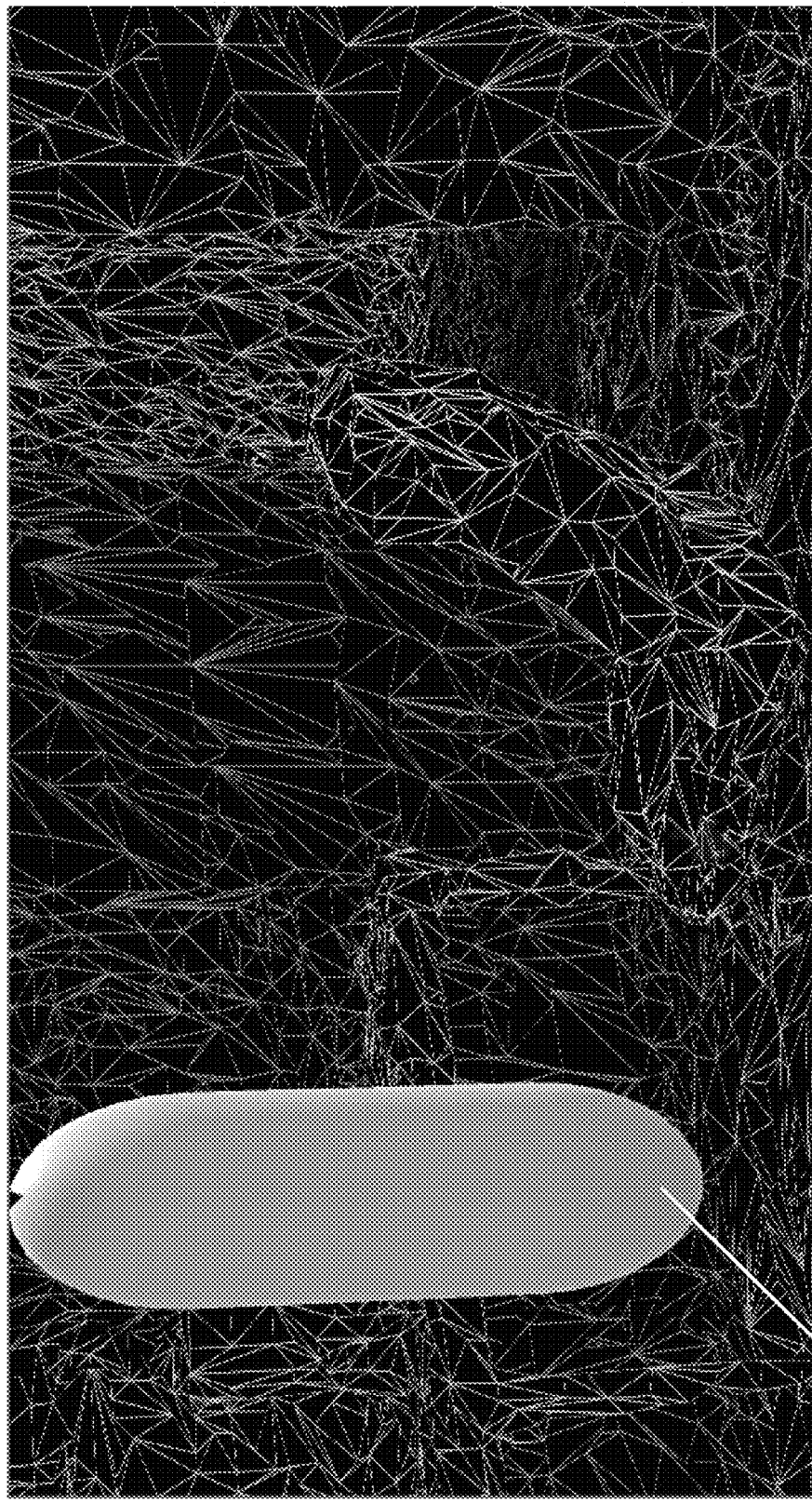
FIGS. 3F and 3G conceptually illustrate the insertion of a 3D guide avatar within a 3D spatial model, where the 3D guide avatar can be controlled to move through the 3D spatial model generating audio instructions to assist with navigation in accordance with an embodiment of the invention.
Figure 3G:
Figure 3H:
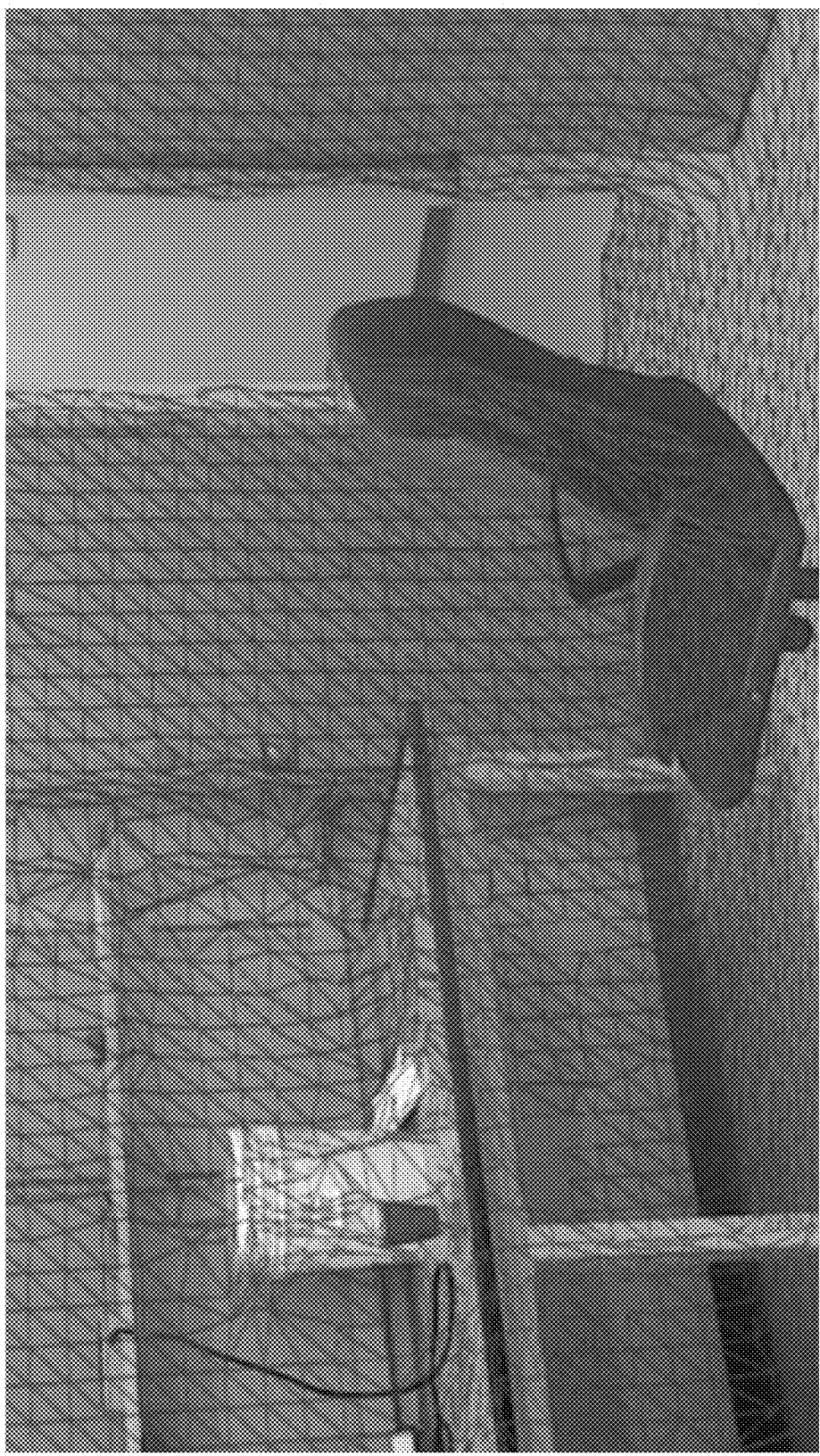
FIG. 3H conceptually illustrates a 3D spatial model generated from the 3D mesh shown in FIG. 3C using a spatial understanding process to identify scene features including ceilings, floors, and walls.
Figure 8:
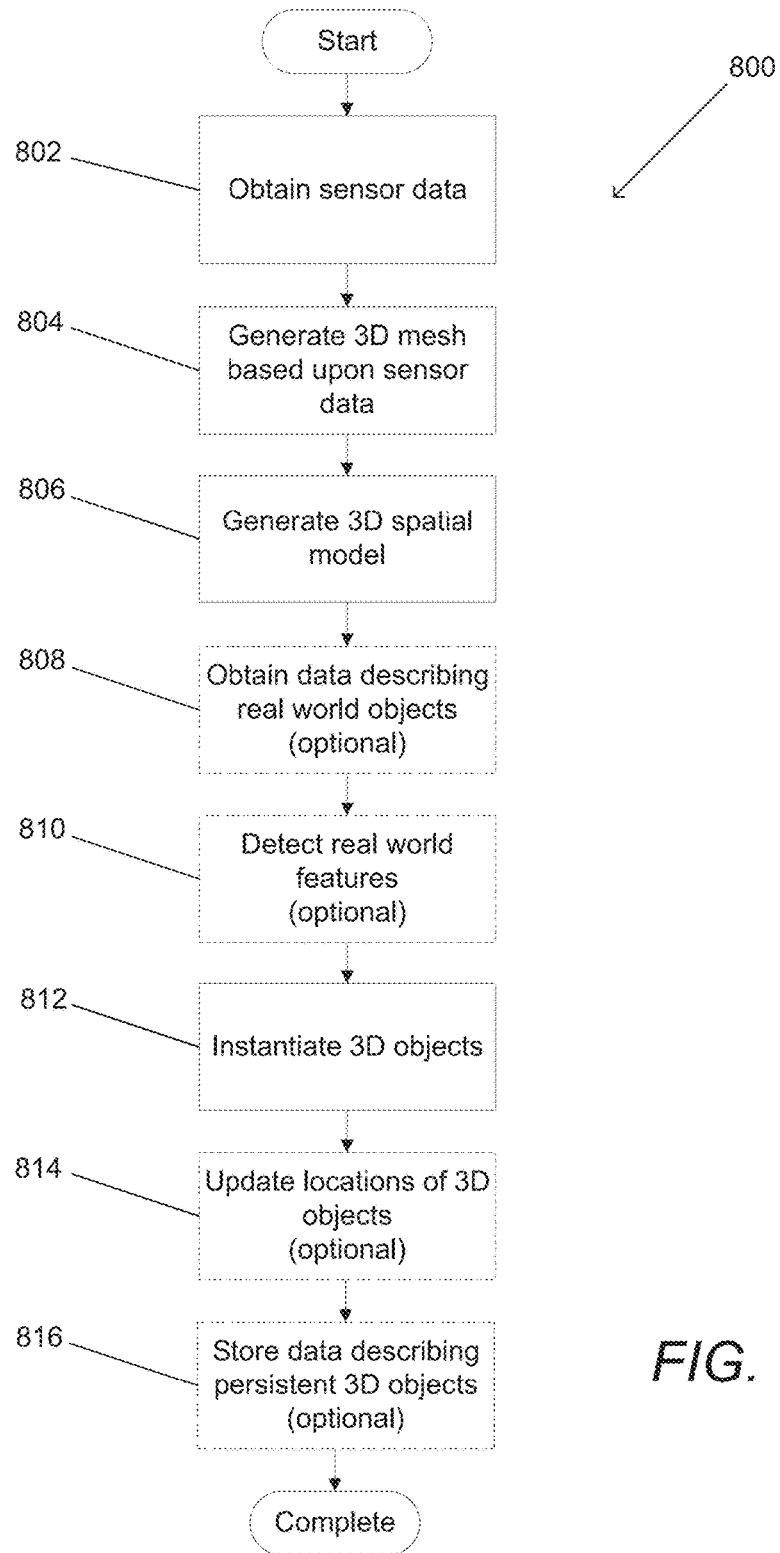
FIG. 8 is a flow chart illustrating a process for generating a 3D spatial model from sensor data acquired by a spatial exploration system in accordance with an embodiment of the invention.

Spatial exploration systems in accordance with many embodiments of the invention can generate 3D spatial models using sensor data including (but not limited to) image data and depth or distance information. A process for generating a 3D spatial model and instantiating 3D objects within the 3D spatial model in accordance with an embodiment of the invention is illustrated in FIG. 8. The process 800 includes obtaining (802) sensor data that can be utilized to generate a 3D spatial model. In many embodiments, the sensor data is initially used to generate (804) a 3D mesh (see e.g. FIG. 3B). In many instances, an initial 3D mesh can be refined based upon semantic information concerning a scene. In many embodiments, the process 800 detects surfaces that are likely to constitute ceilings, floors, walls and/or work surfaces and refines the initial 3D mesh to reflect the nature of the surfaces. In this way, priors can be utilized to clean up noise that is typically present in meshes generated from raw sensor data. As is discussed further below, information concerning the semantic content of a scene can be utilized to guide processes that seek to understand further information concerning the scene (e.g. feature detection processes) and/or navigate users through the environment. A refined 3D mesh incorporated within a 3D spatial model generated in accordance with an embodiment of the invention is illustrated in FIG. 3H. In a number of embodiments, the initial 3D mesh, a refined mesh, and/or image data is utilized to generate a voxel based 3D spatial model of a scene. As can readily be appreciated, any of a variety of different 3D spatial models and processes for generating (806) 3D spatial models can be utilized within process 800 as appropriate to the requirements of specific applications.

In many embodiments, process 800 involves obtaining (808) data from memory or from a remote source concerning persistent objects within an environment and/or information describing objects that are likely to be present within a particular environment (e.g. a descriptors of employees, and/or furniture located within a premises). Process 800 can also involve detection (810) of real world features within the surrounding environment that can be annotated within the 3D spatial model using 3D objects. As noted above, the detection of features can be guided by semantic understanding of the scene. In a number of embodiments, the feature detection can be guided by information obtained by the spatial exploration system describing features likely to be present within the environment. Based upon real world objects determined to be present within the scene, process 800 can instantiate (812) 3D objects that describe real world objects. In many embodiments, the 3D objects occupy locations within the 3D spatial model that correspond to the real world locations of the features described by the 3D objects (see, for example, the 3D object instantiated within the 3D spatial model shown in FIGS. 3D and 3E). In many embodiments, the process 800 also instantiates (812) synthetic or virtual 3D objects that form part of the user interface of the spatial exploration system including (but not limited to) a 3D guide avatar. A 3D guide avatar inserted within a 3D mesh of a 3D spatial model in accordance with an embodiment of the invention is illustrated in FIGS. 3F and 3G. While the 3D guide avatar in the illustrated embodiment is a simple shape hovering within the scene, the 3D guide avatar can take on any of a variety of forms including an articulated 3D character rigged for animation by a game engine implemented within the spatial exploration system. As can readily be appreciated the specific 3D objects instantiated within a 3D spatial model are typically dependent upon the requirements of a given spatial exploration application.

In many embodiments, the scene is dynamic and locations of 3D objects within a 3D spatial model are dynamically updated (814) to reflect detected motion of the corresponding real world features. In a number of embodiments, data describing detected features is stored (816) on the spatial exploration device and/or on remote servers to enable the sharing of information between spatial exploration sessions and/or spatial exploration devices.

While specific processes for building 3D spatial models and instantiating 3D objects within the 3D spatial models are described above with respect to FIG. 8, any of a variety of processes can be used to generate 3D spatial models and/or to determine locations in which to instantiate 3D objects within a 3D spatial model including (but not limited to) processes that utilize stored and/or downloaded floor plans and/or 3D spatial models of a particular environment as appropriate to the requirements of a specific application in accordance with various embodiments of the invention. Processes for annotating 3D objects within a 3D spatial model using audio labels that can be utilized to generate spatial sound in accordance with a number of embodiments of the invention are discussed below.

Spatial Sound Generation

Spatial exploration systems in accordance with many embodiments of the invention convey spatial audio information concerning a surrounding environment. In a number of embodiments, the spatial exploration systems generate vocalized information from text describing scene features and/or user interface output. In certain embodiments, the text information is utilized to generate audio clips of audio labels. The audio clips can be temporarily stored within the spatial exploration system while the 3D object associated with the audio clip satisfies at least one criterion such as (but not limited to) a range and/or line of sight criterion. The audio clips can then be manipulated to generate spatial sound encoding the location and/or direction of a 3D object. When the audio clip is no longer required, the audio clip can be overwritten within the memory of the spatial exploration system to free up memory for additional processes and/or more relevant data.

Figure 9:
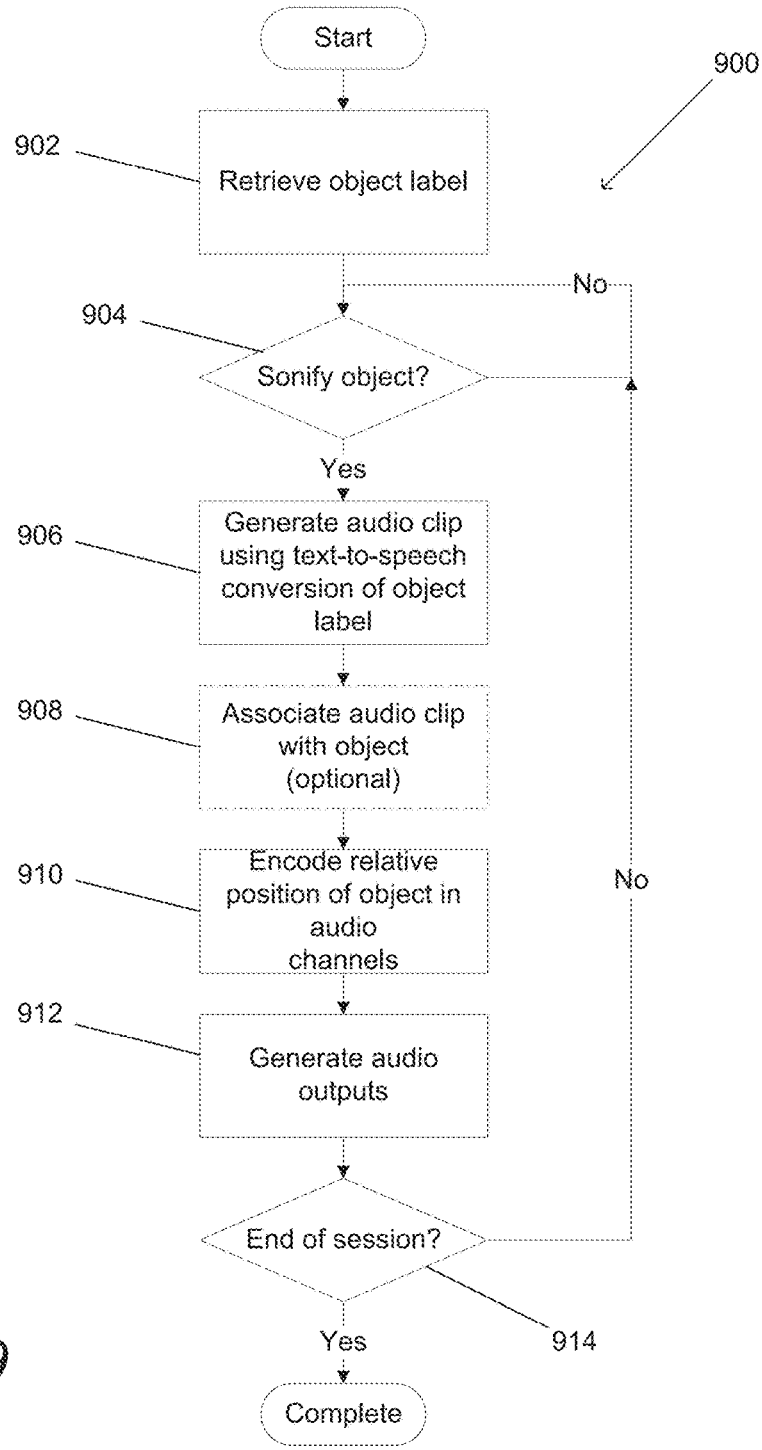
FIG. 9 is a flow chart illustrating a process for generating spatial sound from an audio label of a 3D object in accordance with an embodiment of the invention.

A process for generating an audio clip for a 3D object and using the generated audio clip to produce spatial sound is conceptually illustrated in FIG. 9. The process 900 includes retrieving (902) an object label for a 3D object. When the spatial exploration system determines (904) that sonification of a specific 3D object is required, the object label is then utilized to generate (906) an audio clip using a text-to-speech conversion process. A data structure within the memory of the spatial exploration system can then be dynamically updated (908) to associate the audio clip with the 3D object. Spatial sound can be generated by modifying (910) copies of the audio clip to encode the position of the 3D object relative to the estimated position of the user's ears within the 3D spatial model. In this way, the modified copies of the audio clip can be used to generate (912) a spatial sound that provides an audio cue as to the location of the real world feature described by the vocalized information. In many embodiments, the spatial information encoded within the spatial sound can be enhanced by further modulating the pitch of the sound based upon the distance of the real world feature from the user. In this way, a user can rapidly train herself to understand audio cues within spatial sound that are in addition to the audio cues designed to imitate natural audio. As can readily be appreciated, the manner in which direction and/or location information can be encoded as audio cues within vocalized information is only limited by the ability of users to perceive the encoded spatial information.

In order to free resources, processes in accordance with a number of embodiments of the invention free resources used to store audio clips. In other embodiments, the audio clips are generated prior to a determination being made to sonify a 3D object and/or audio clips are persistent in memory until a determination is made that the 3D object associated with the audio clip is no longer likely to be sonified (e.g. the 3D object is out of range). As can readily be appreciated, the timing of the generation of audio clips and the memory management processes utilized by spatial exploration systems is typically dependent upon the requirements of a given application. When a determination (914) is made that a spatial exploration session is over, then the process completes.

While specific processes for generating spatial sound for audio labels of 3D objects are described above with reference to FIG. 9, any of a variety of techniques can be utilized to generate spatial sound including processes that receive audio files as part of the data describing specific 3D objects. As can readily be appreciated, audio labels are only one type of vocalized information that can be useful to users of spatial exploration systems. Processes involving generation of vocalized information to assist with collision avoidance and as guidance during navigation in accordance with certain embodiments of the invention are discussed further below.

Collision Avoidance

In many embodiments and particularly in embodiments utilized by visually impaired users, collision avoidance processes are utilized to provide audible warnings notifying users of the presence of surfaces and/or objects prior to collision. In a number of embodiments, collision avoidance processes are utilized that implement a dynamic collision perimeter within the 3D spatial model that follows the user in real time. The collision perimeter can expand and contract based upon factors including (but not limited to) the speed of the user and/or proximity of surfaces within the 3D spatial model.

Figure 10:
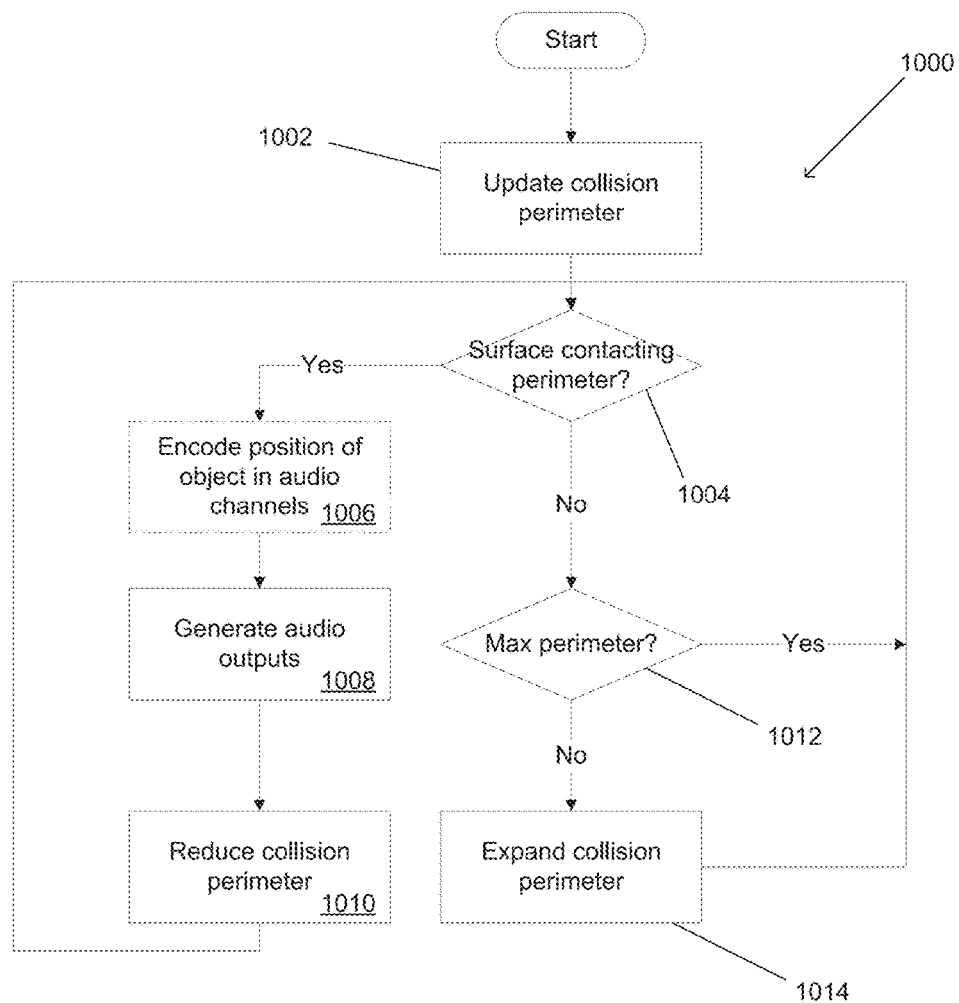
FIG. 10 is a flow chart illustrating a process for generating spatial sound to assist with collision avoidance in accordance with an embodiment of the invention.

A process for performing collision avoidance in accordance with an embodiment of the invention is illustrated in FIG. 10. The process 1000 includes initializing and updating 1002 the location of collision perimeter within the 3D spatial model. The collision perimeter can be defined by instantiating a 3D object within the 3D spatial model. Many spatial exploration systems utilize game engines to control movement of 3D objects within 3D spatial models. The location of the collision perimeter 3D object within the 3D spatial model can be determined (1002) based upon the location within the 3D spatial model corresponding to the estimated real world location of the user. In many embodiments, the game engine generates collision events when the collision perimeter 3D object contacts surfaces within the 3D spatial model. When the process 1000 determines (1004) that the collision perimeter is contacting a surface within the spatial model, a spatial sound is encoded so that the spatial sound is localized at the contact between the surface of the collision perimeter 3D object and a surface within the 3D spatial model of the surrounding environment. The spatial sound generated (1008) by the spatial exploration system can be white noise and/or a beep that increases in intensity inversely with distance. As can readily be appreciated, the specific sound produced is largely dependent upon the requirements of a given application and/or the preferences of a user. As the user approaches a surface, the size of the collision perimeter 3D object can be reduced (1010) to reflect the continued contact between the surface of the collision perimeter and the surface within the 3D spatial model of the surrounding environment. In a number of embodiments, the extent to which the collision perimeter can be reduced is limited to a minimum size at which point a vocalized warning can be generated by the spatial exploration system to warn the user of an impending collision.

When contact does not occur between the collision perimeter 3D object and surfaces of the 3D spatial model, the collision perimeter can expand (1014) until a determination (1012) is made that the collision perimeter 3D object has reached a maximum size. The maximum size of the collision perimeter 3D object can depend upon the speed with which the user is moving through the environment and/or the structure of the environment.

Figure 11A:
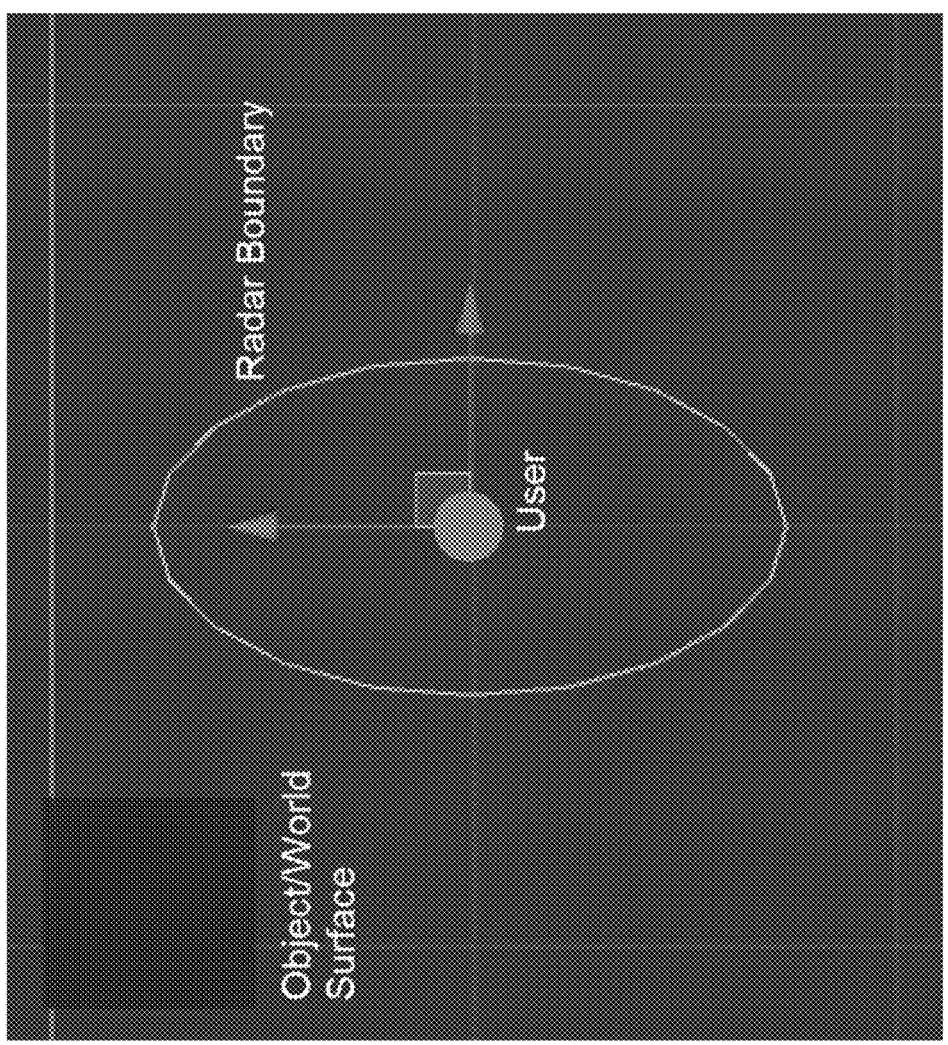
FIGS. 11A-11C conceptually illustrate a collision perimeter 3D object utilized within a collision avoidance process in accordance with an embodiment of the invention.
Figure 11B:
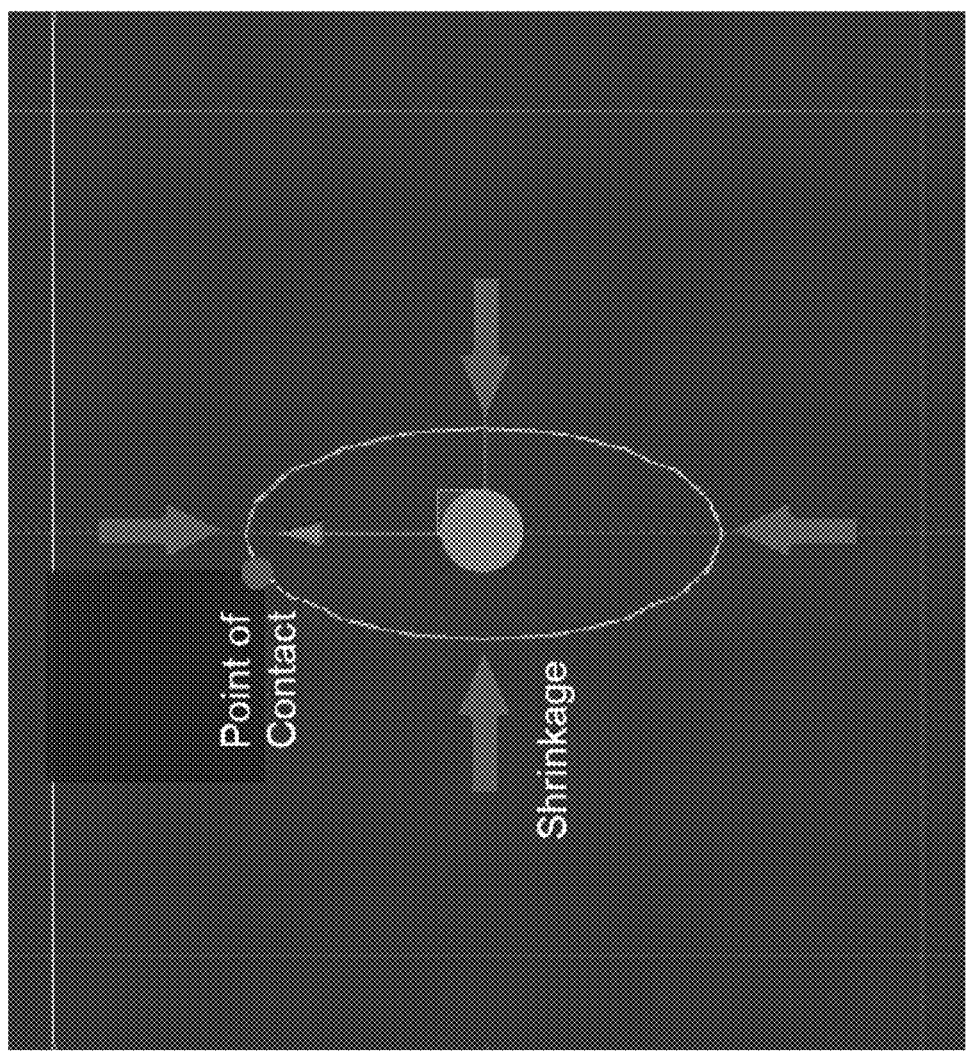
Figure 11C:
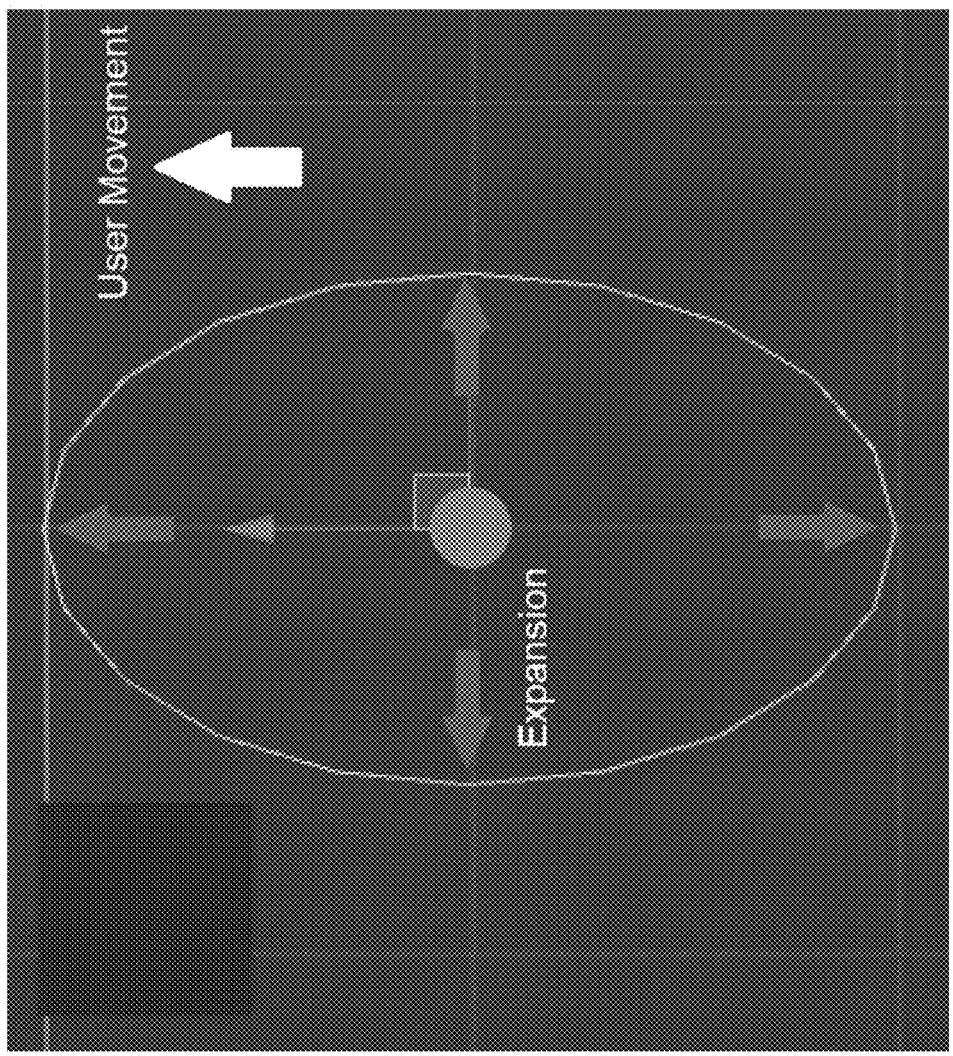

In several embodiments, the perimeter is represented as an elliptic cylinder 3D object within the 3D spatial model, where the elliptic cylinder has the same azimuthal facing as the user. An elliptic cylinder collision perimeter 3D object is conceptually illustrated in FIG. 11A. The elliptic cylinder provides increased front and back detection range. In other embodiments, a collision perimeter can be defined using a 3D object having any of a variety of appropriate shapes including but not limited to rectangular prisms. In several embodiments, only a front surface of a collision perimeter increases and/or decreases based upon movement of the user. In certain embodiments, various surfaces of a 3D object representing a collision perimeter are modified in different ways depending upon movement of the user. Contact between the surface of an elliptic cylinder collision perimeter 3D object and a surface of another object within a 3D spatial model in accordance with an embodiment of the invention is conceptually illustrated in FIG. 11B. When there are no surfaces from the 3D spatial model that encroach within the boundaries of the collision perimeter, the collision perimeter can expand as conceptually illustrated in FIG. 11C. As noted above, the extent to which the collision perimeter 3D object can expand can be determined based upon a variety of factors including (but not limited to) the speed with which the user is moving and/or the structure of the surrounding environment.

Although specific processes for generating collision avoidance spatial sound alerts are described above with reference to FIG. 10 and FIGS. 11A-11C, any of a variety of processes can be utilized to generate spatial sound that provides information concerning proximity to objects for the purposes of collision avoidance can be utilized as appropriate to the requirements of a given application. As can readily be appreciated, collision avoidance can be an important component of a larger navigation process utilized to guide a user through an environment including (but not limited to)

an indoor environment. Navigation processes in accordance with various embodiments of the invention are discussed further below.

Guidance and Navigation

Figure 12A:
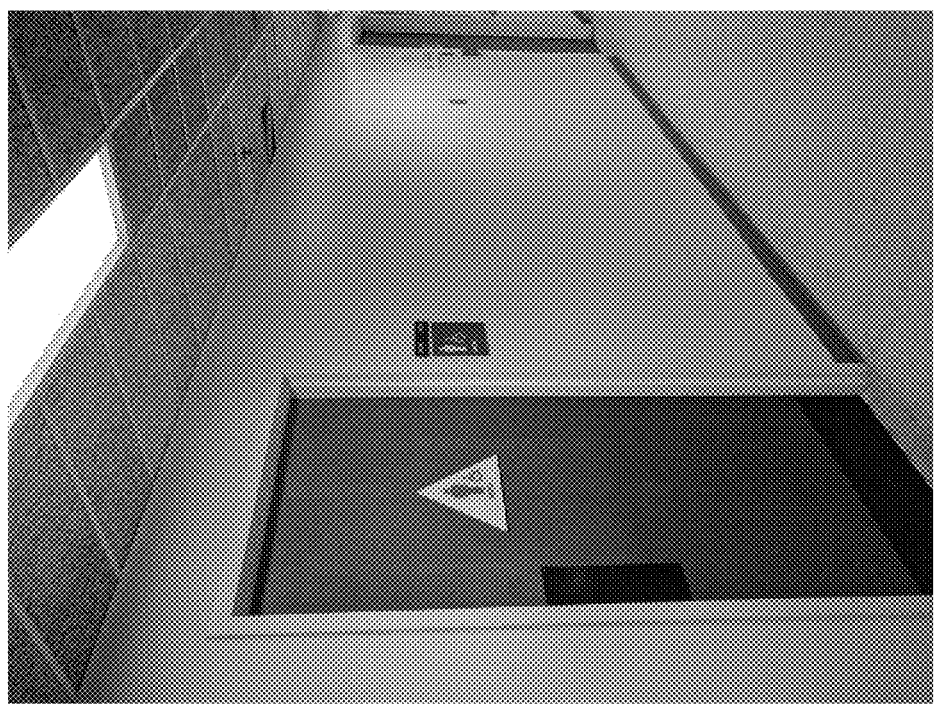
FIGS. 12A-12C conceptually illustrate detection of a rest room sign and the addition of a 3D object to a 3D spatial model to annotate the corresponding location of a rest room in accordance with an embodiment of the invention.
Figure 12B:
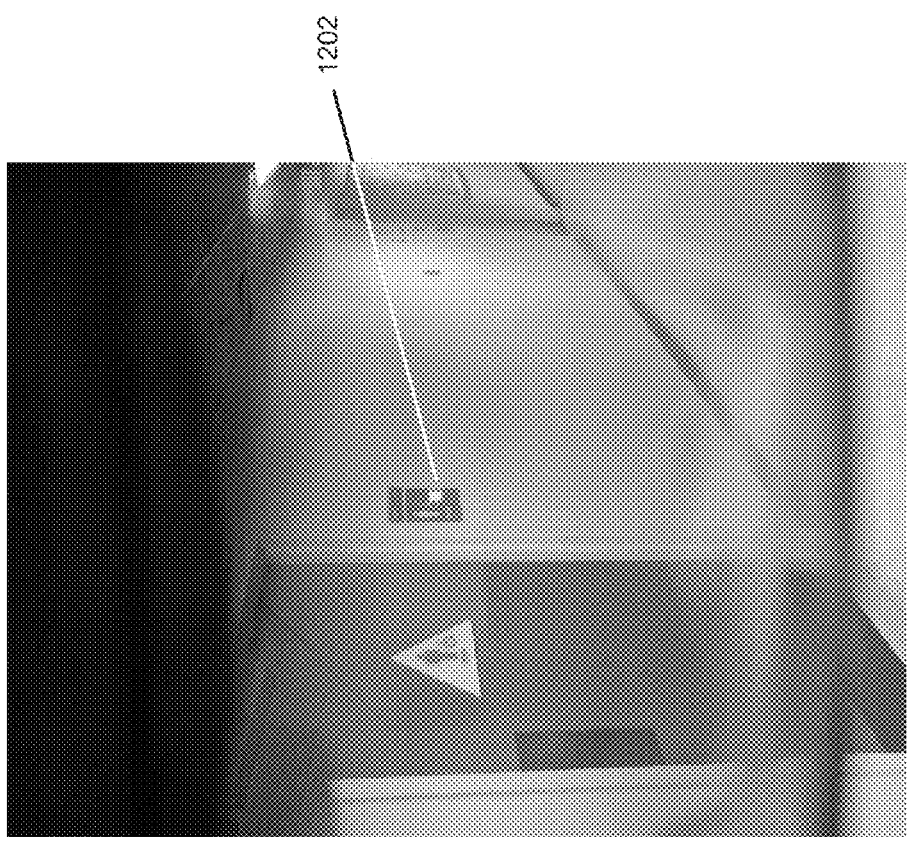
Figure 12C:

Spatial exploration systems in accordance with many embodiments of the invention support a "guide mode" in which a user can request that the spatial exploration system provide assistance navigating to a desired destination. In a number of embodiments, the spatial exploration system utilizes floorplans to construct a route and places waypoints along the route to assist with navigation. In several embodiments, the waypoints are chosen based upon factors including (but not limited to) distance form a previous waypoint and/or change in direction of a route. In circumstances where floorplans are unavailable, the spatial exploration system can utilize a series of rules to explore the environment with the goal of ultimately reaching a desired objective. For example, a user may request that the spatial exploration system guide them to a rest room. In the absence of a floor plan, the spatial exploration system can guide the user to an exit and can explore adjoining rooms or corridors until signs containing floorplans and/or signs indicating the presence of a rest room are located. Detection of a rest room sign and the addition of a 3D object to a 3D spatial model to annotate the corresponding location of a rest room in accordance with an embodiment of the invention is conceptually illustrated in FIGS. 12A-12C. An image captured by a spatial exploration system in accordance with an embodiment of the invention showing a door featuring a rest room sign is shown in FIG. 12A. A 3D object 1202 generated by the spatial exploration system annotating the restroom sign is shown in FIG. 12B. The spatial exploration system can instantiate a persistent 3D object within the 3D spatial model annotating the corresponding location of the restroom. In many embodiments, the 3D object annotating a feature of the real world environment (particularly features on planar surfaces) can be slightly offset so that the 3D object is visible when the real world feature is occluded. The presentation (1204) of the 3D object annotating the restroom as a hologram via a mixed reality display to assist with spatial exploration when the rest room sign is occluded in accordance with an embodiment of the invention is shown in FIG. 12C. As can readily be appreciated, the specific objects detected by a spatial exploration system and/or rules that are utilized in formulating a route designed to locate a specific destination can be selected based upon the requirements of a given application.

Figure 13:
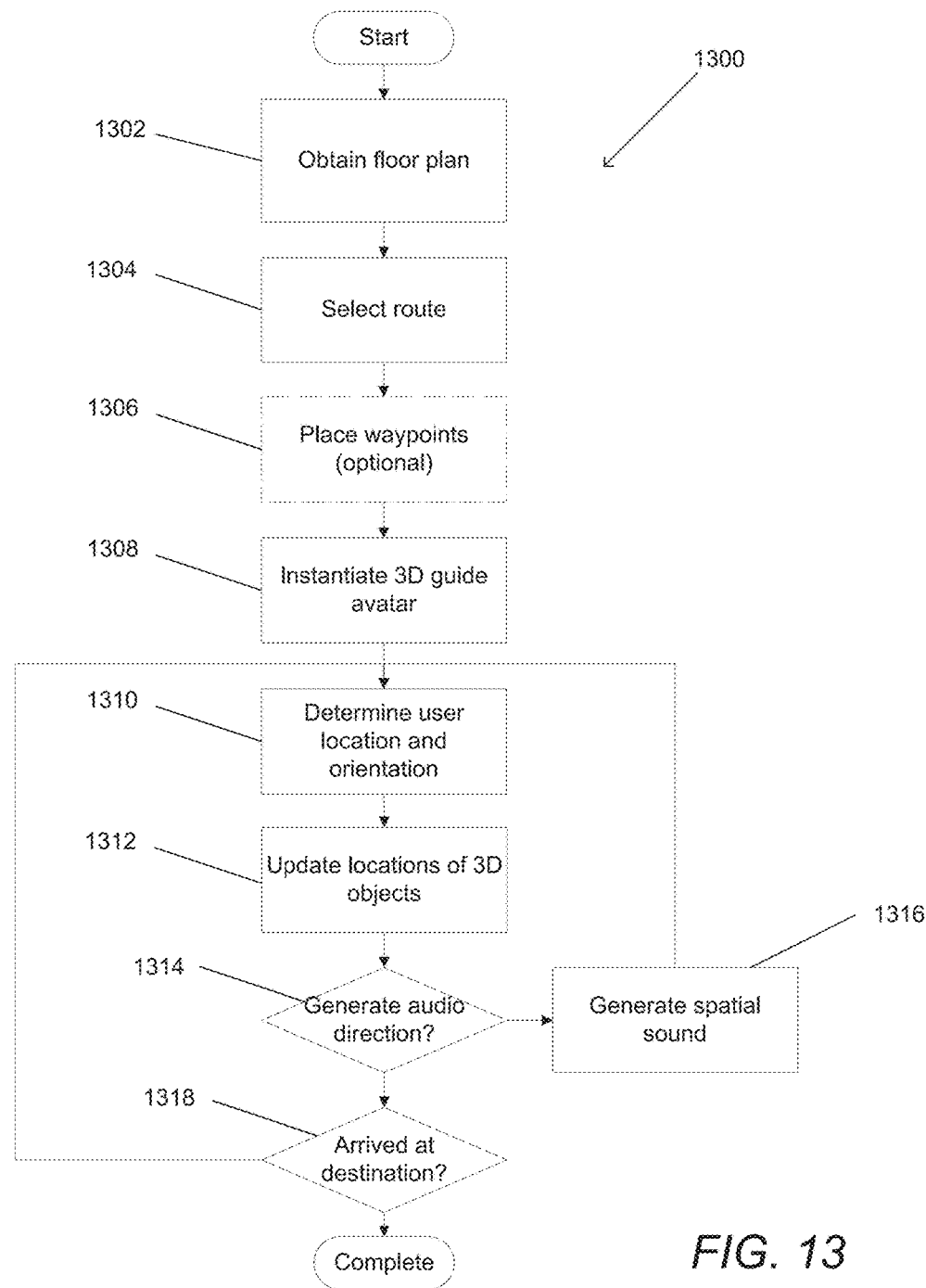
FIG. 13 is a flow chart illustrating a process for performing navigation guidance using a spatial exploration system in accordance with an embodiment of the invention.

A process for performing indoor navigation based upon a floorplan in accordance with an embodiment of the invention is illustrated in FIG. 13. The process 1300 includes obtaining (1302) a floor plan. Based upon a desired destination, a route is selected (1304). In many embodiments, the route can be selected from amongst a number of predetermined routes. In several embodiments, routes are dynamically determined based upon the present location of the user and the desired destination. In a number of embodiments, the process of generating a route also includes placement (1306) of waypoints along the route to assist with guidance. In many embodiments, previously generated routes also include waypoints to assist with navigation and guidance. In a number of embodiments, a building can incorporate actual machine readable waypoints including (but not limited to) barcodes, beacons, and/or QR codes.

Figure 14:
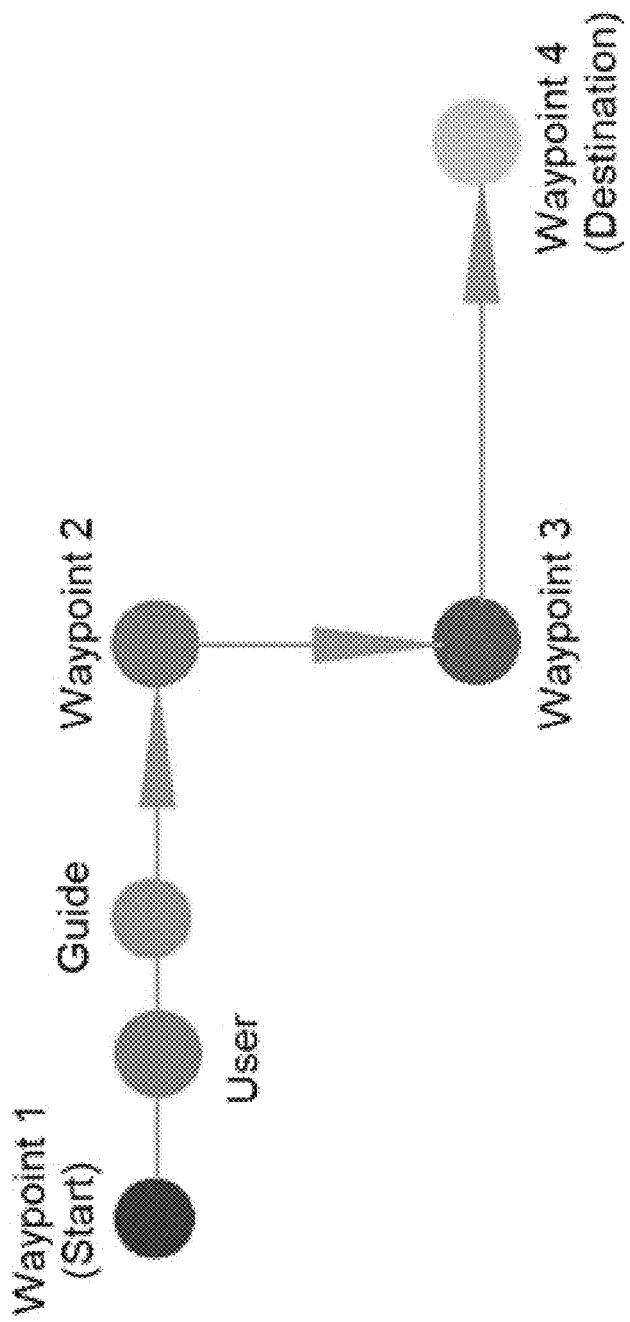
FIG. 14 conceptually illustrates placement of waypoints and a 3D guide avatar along a route during a navigation process performed in accordance with an embodiment of an invention.
Figure 15:
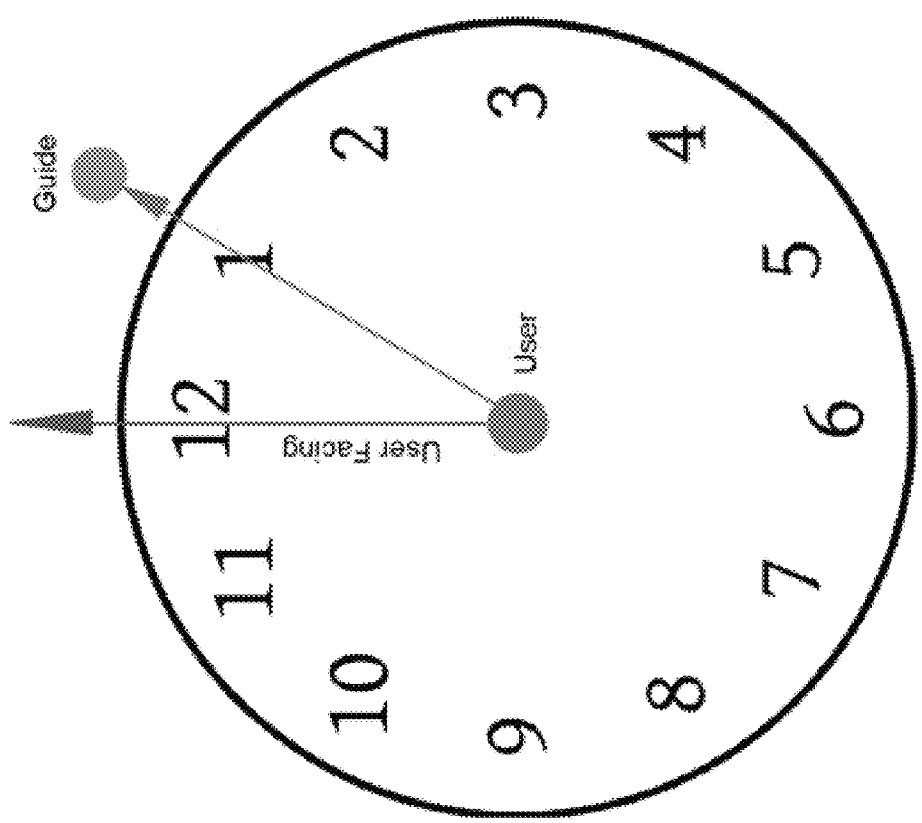
FIG. 15 conceptually illustrates positioning of a 3D guide avatar relative to a user during a navigation process performed in accordance with an embodiment of the invention.

In order to commence navigation guidance, a spatial exploration system can instantiate (1308) a 3D guide avatar. The location of the 3D guide avatar within the 3D spatial model serves as the basis for determining the manner in which to generate spatial sound. In a number of embodiments, the 3D guide avatar moves ahead of the user along the route and the spatial exploration system can sonify the location of the 3D guide avatar (e.g. using spatial sounds in the form of a vocalized guidance directive, a vocalized narrative of proximate 3D objects, footsteps and/or music) and/or provided spatial sounds containing vocalized information that are perceived as originating from a location in the real world corresponding to the location of the 3D guide avatar in the 3D spatial model. Placement of waypoints and the position of the guide relative to the position of a user along a route is conceptually illustrated in FIG. 14. In many embodiments, the location of the 3D guide avatar is slightly offset relative to the heading of the user as conceptually illustrated in FIG. 15. Offsetting the avatar relative to the forward motion of the user along the route can create the perception that the 3D guide avatar is leading the user and to avoid a sensation that the user is about to collide with the 3D guide avatar. In embodiments in which the 3D guide avatar is displayed via a mixed reality display, offsetting the 3D guide avatar relative to the forward motion of the user along the route prevents the guide avatar from occluding the path ahead.

The process 1300 involves determining (1310) the location of the user and/or the user's orientation. As is discussed further below, the user's heading relative to the route and/or 3D guide avatar can be utilized as a factor considered when determining whether to generate vocalized directions. The location and/or orientation of a 3D object corresponding to the user and/or the 3D guide avatar within the 3D spatial model can be updated (1312) based upon the estimated location and heading of the user.

Figure 16:
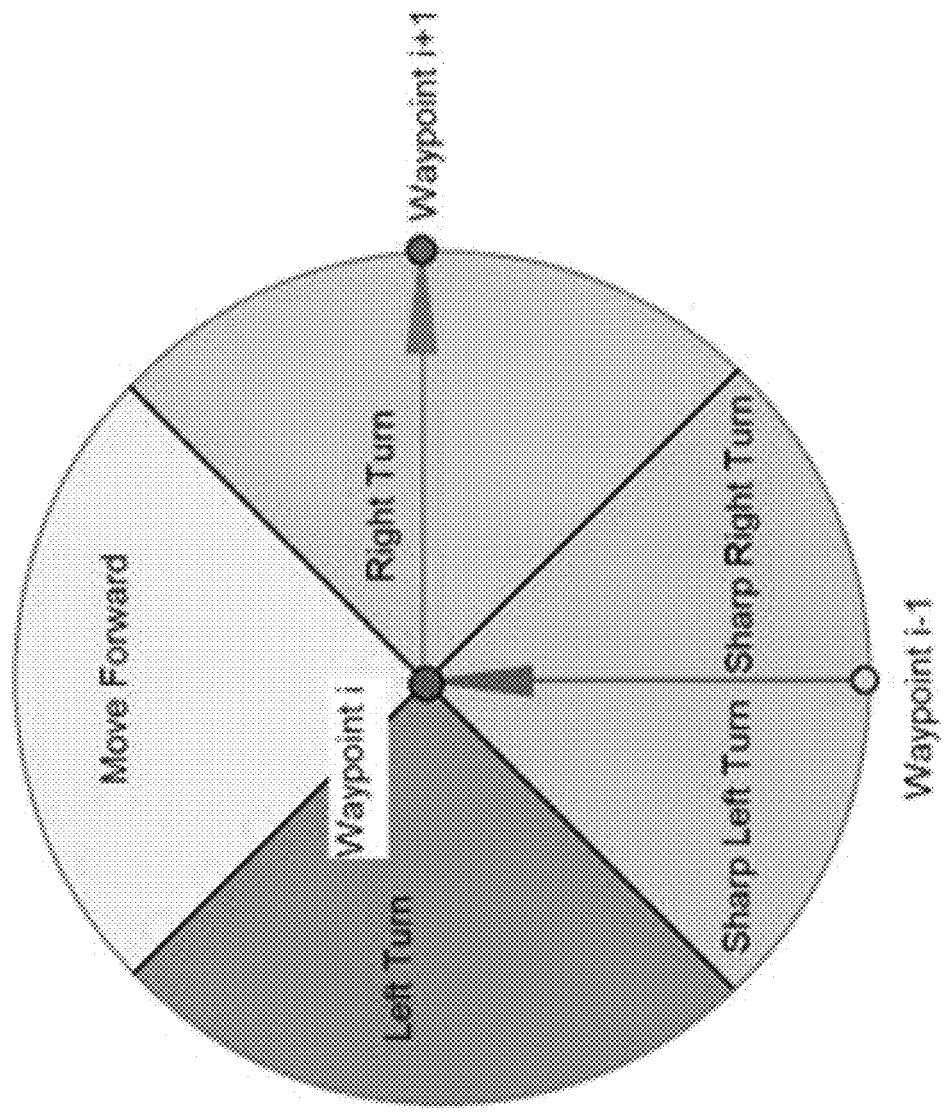
FIG. 16 conceptually illustrates vocalized information generated based upon the position of a waypoint relative to the position of a user in accordance with an embodiment of the invention.

Based upon the location and/or orientation of the user and/or user requests received via any of a number of different user input modalities, the process 1300 can determine (1316) that a spatial sound containing a vocalized guidance direction should be generated. In many embodiments, spatial sound is continuously and/or periodically generated sonifying the location of the 3D guide avatar. Vocalized guidance directions can provide more specific verbal directions including (but not limited to) "turn left", "turn right", "go up stairs", "go down stairs", and/or "turn around". In many embodiments, the specific vocalized instruction is determined based upon the estimated location and orientation of the user relative to waypoints along the route as is conceptually illustrated in FIG. 16. The specific instructions are typically dependent upon the requirements of a given environment and/or application.

Figure 17:
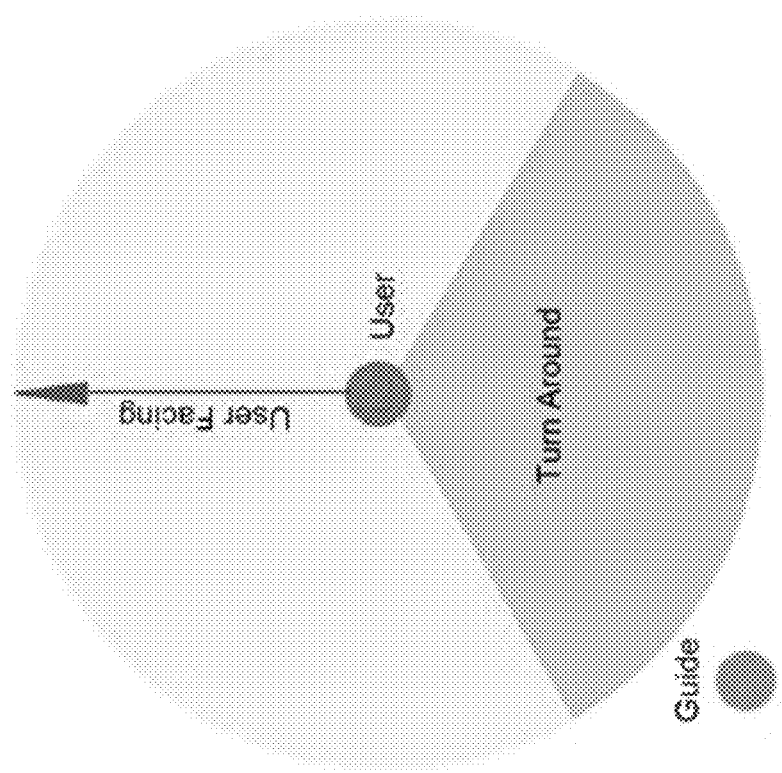
FIG. 17 conceptually illustrates generation of vocalized information in order to enable a user to locate a virtual 3D guide avatar outside the user's field of view in accordance with an embodiment of the invention.

As can readily be appreciated, a user can change orientation and/or move off the route despite spatial sound directives generated by the spatial exploration system during the guidance process. In which case, the virtual guide remains proximate on the path to assist with guiding. The spatial exploration system can generate spatial sound as an audio cue to indicate the direction of the virtual guide and the route. In many embodiments, the spatial exploration system detects when the user is having trouble locating the 3D guide avatar and can issue and audio directive to "turn around" under appropriate circumstances as conceptually illustrated in FIG. 17.

When the user reaches the destination and/or the user cancels navigation, a determination (1318) is made that the process should complete. Otherwise, the process continues determining the location of the user, updating the location of 3D objects within the 3D spatial model, and generating appropriate spatial sounds to assist with navigation.

Figure 18A:
FIG. 18A is a photograph of a visually impaired user of a spatial exploration system implement using a Microsoft Hololens in which the user utilizes a clicker input device to request spatial sounds in the form of vocalized directions, where the spatial sounds encode the location of a 3D guide avatar, in accordance with an embodiment of the invention.
Figure 18B:
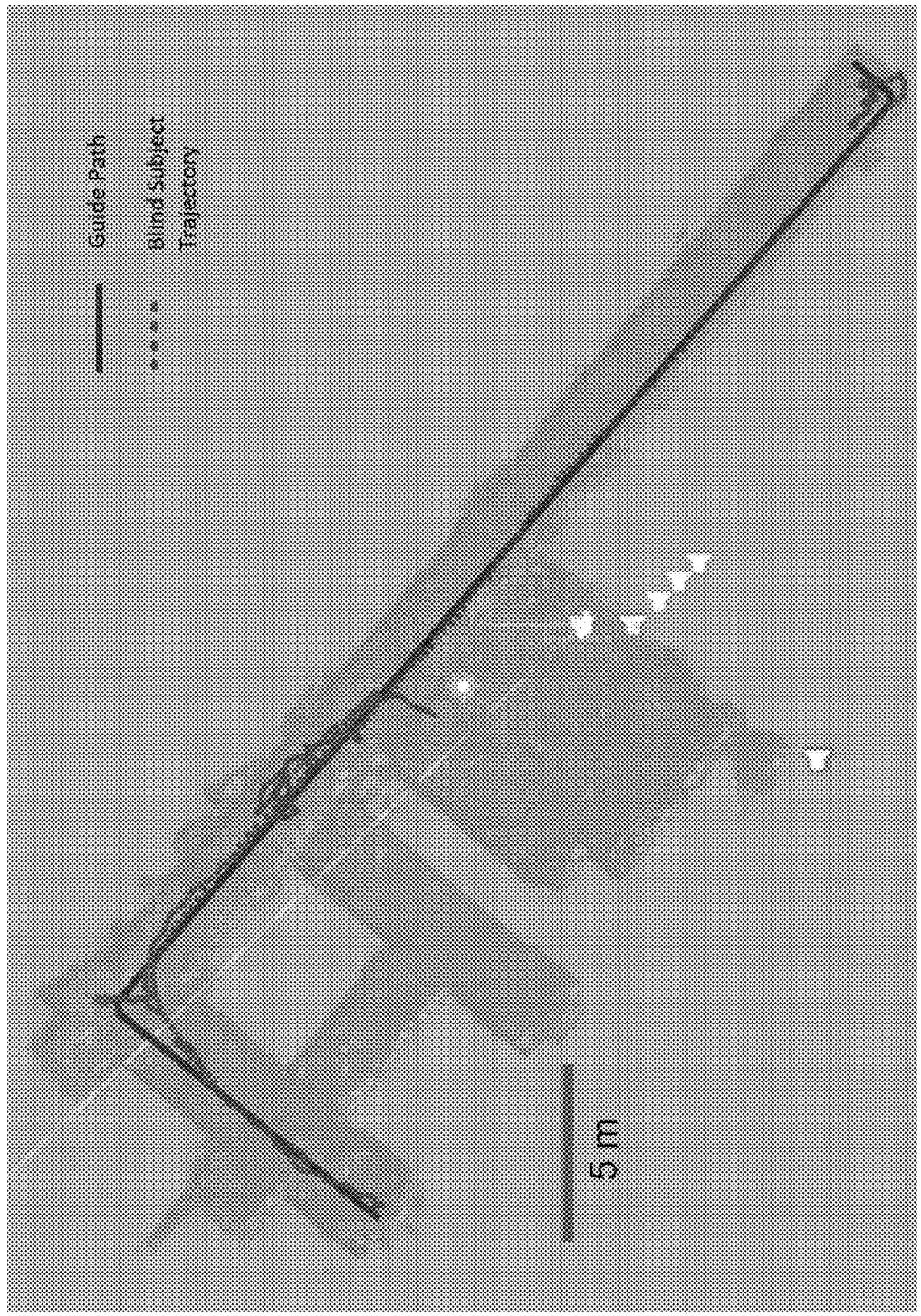
FIG. 18B conceptually illustrates a computer-generated route and a path taken by the user based upon spatial sound vocalized directions generated by a spatial exploration system in accordance with an embodiment of the invention.

As can readily be appreciated, processes similar to the process 1300 illustrated in FIG. 13 can be extremely useful in assisting visually impaired users to navigate in unfamiliar environments. FIG. 18A shows a visually impaired user successfully navigating within an unfamiliar environment using a spatial exploration system including a clicker input device that enables the user to request generation of vocalized directives to provide guidance along the route. The computer-generated route and the path taken by the user based upon spatial sound vocalized directions generated by the spatial exploration system are illustrated in FIG. 18B. Similar benefits can also be obtained when spatial exploration systems are utilized to provide (indoor) navigation guidance to sighted users. In a number of embodiments, navigation guidance is achieved using a combination of spatial sound audio cues and visual display of the 3D guide avatar via a mixed reality display. While specific processes are described above with respect to FIGS. 13-18B for providing navigation guidance, any of a variety of processes can be utilized to guide users of spatial exploration systems along routes using spatial sound and/or other cues as appropriate to the requirements of particular applications in accordance with various embodiments of the invention. The effectiveness of spatial exploration systems in assisting visually impaired users in completing tasks is discussed further below.

Experimental Data

Figure 19:
FIG. 19 is a photograph of a virtual reality based system for simulating the performance of spatial exploration systems in a laboratory setting in which an arbitrary 3D spatial model can be defined and utilized to define tasks.
Figure 20A:
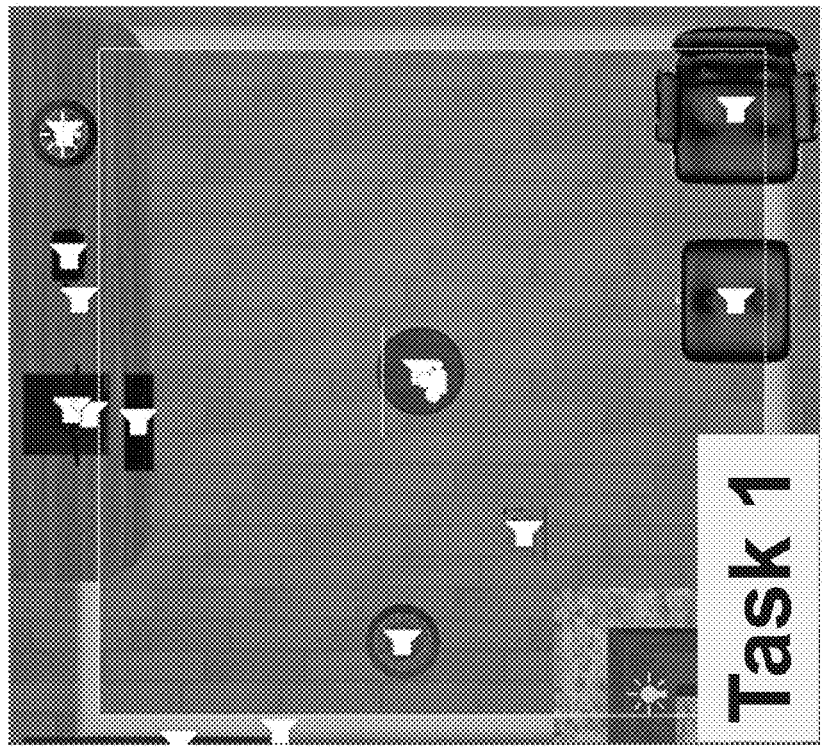
Figure 20B:
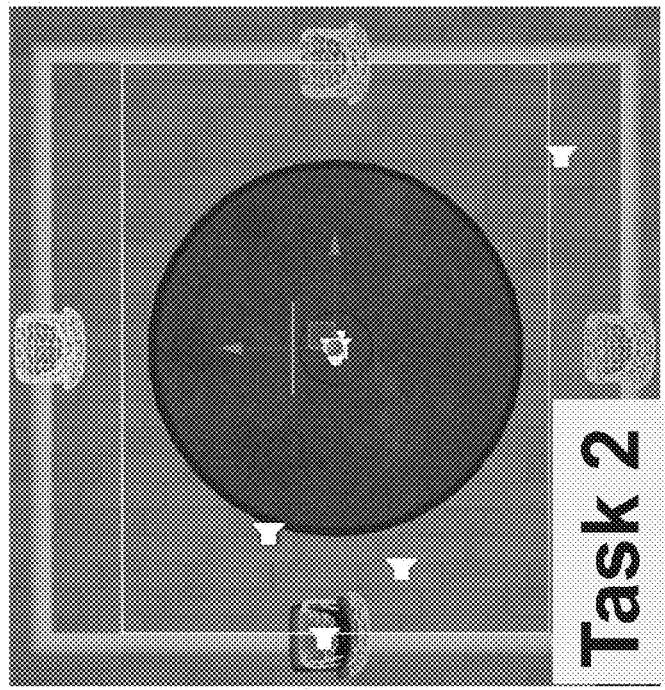
Figure 20F:
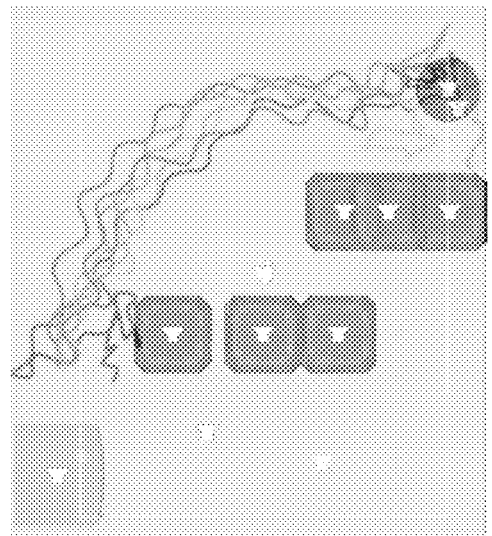
Figure 20E:
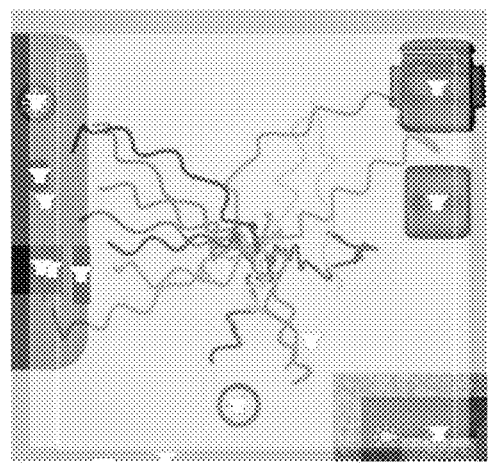
Figure 20D:
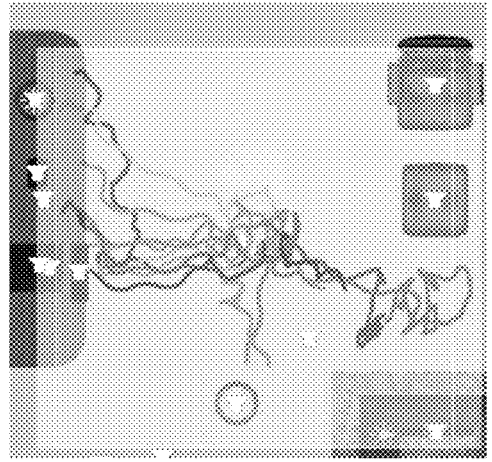
Figures 20G, 20H:
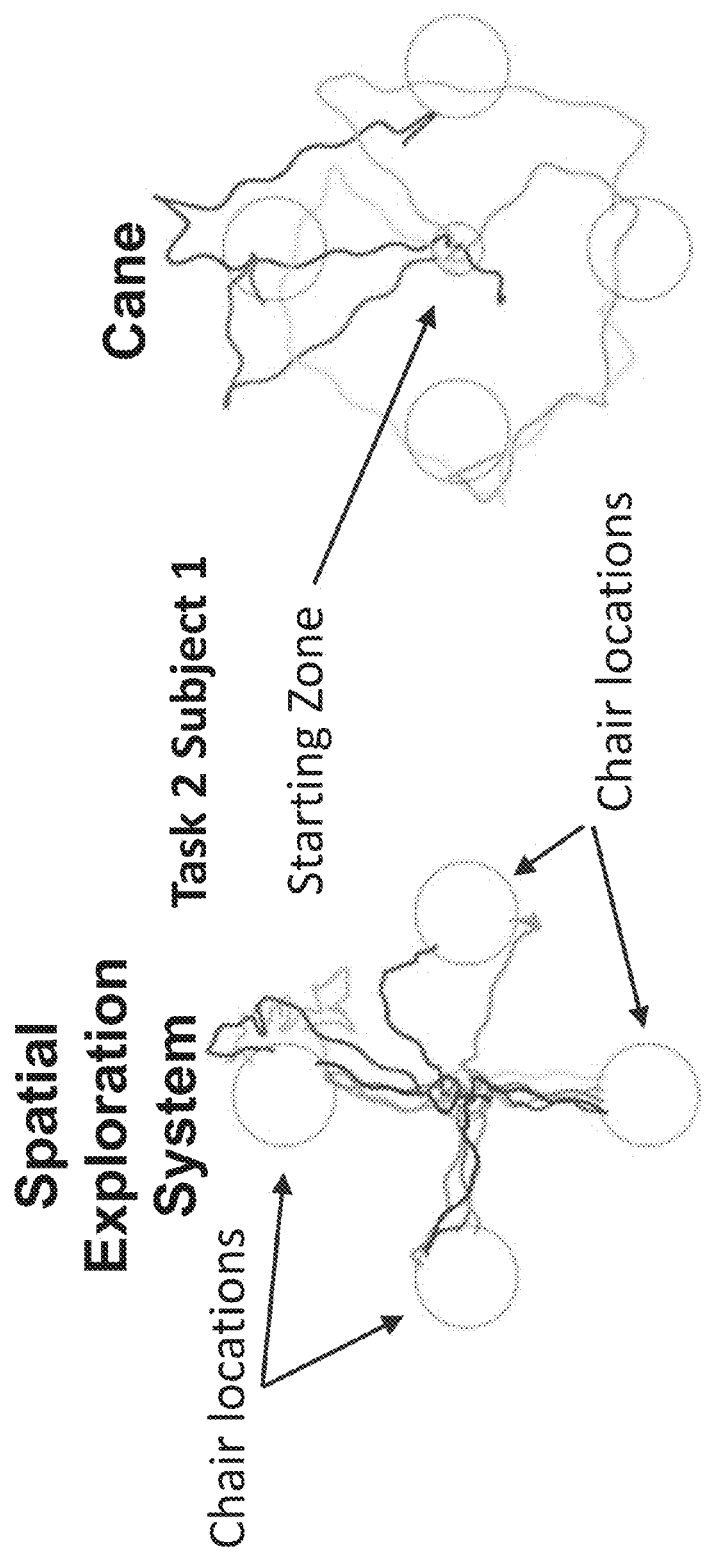
Figures 20I, 20J:
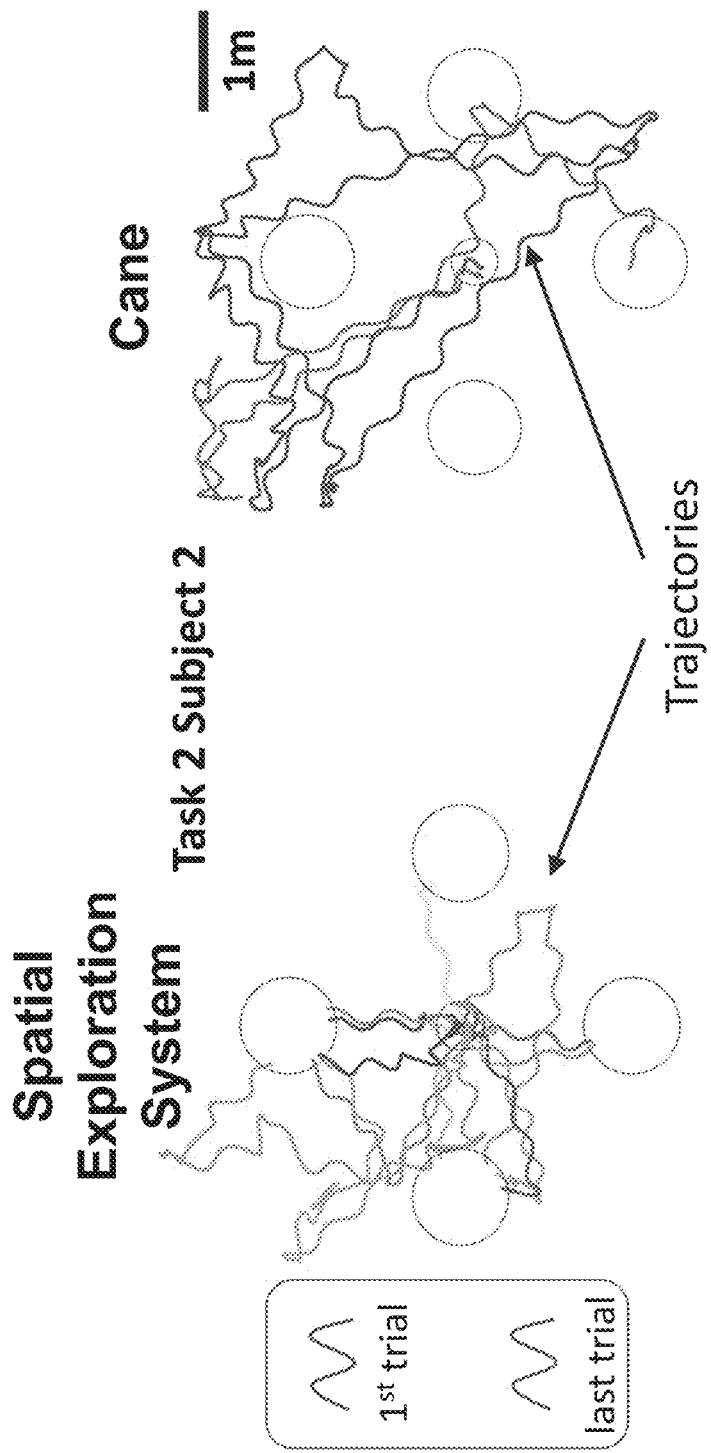
Figure 20K:
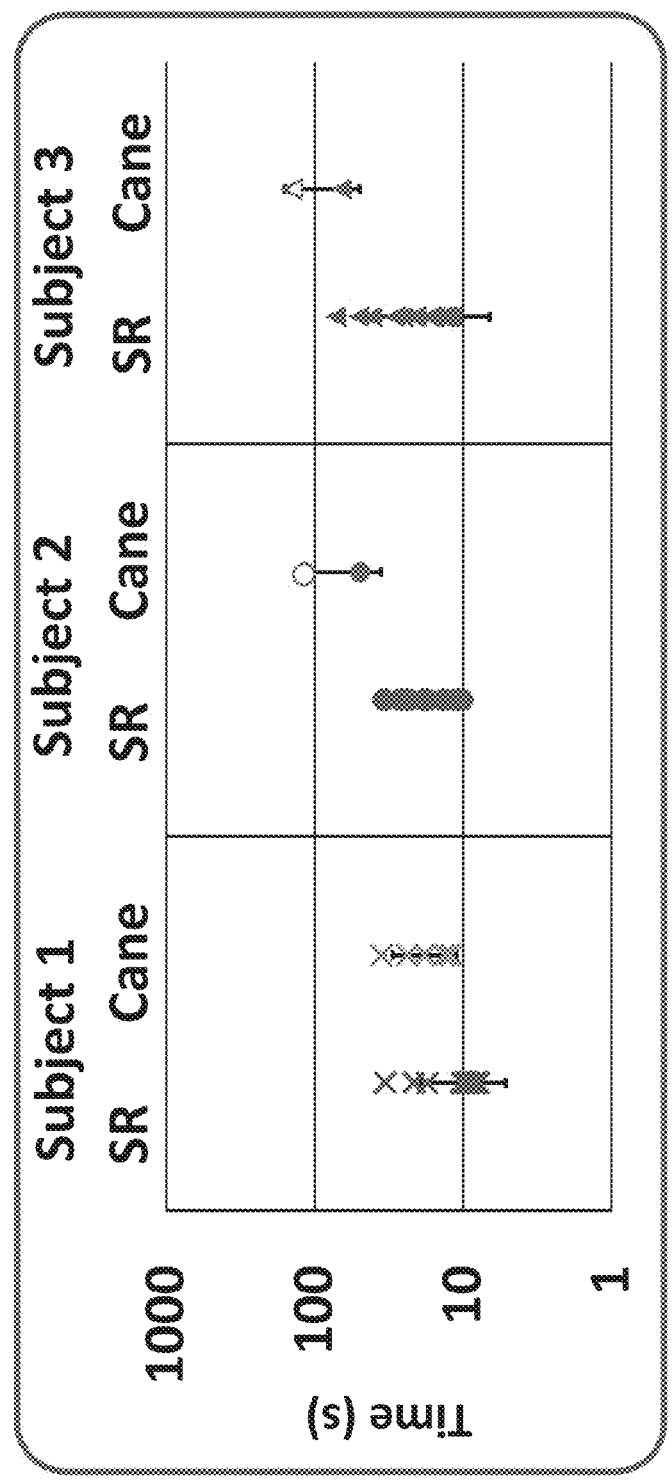
Figure 20L:
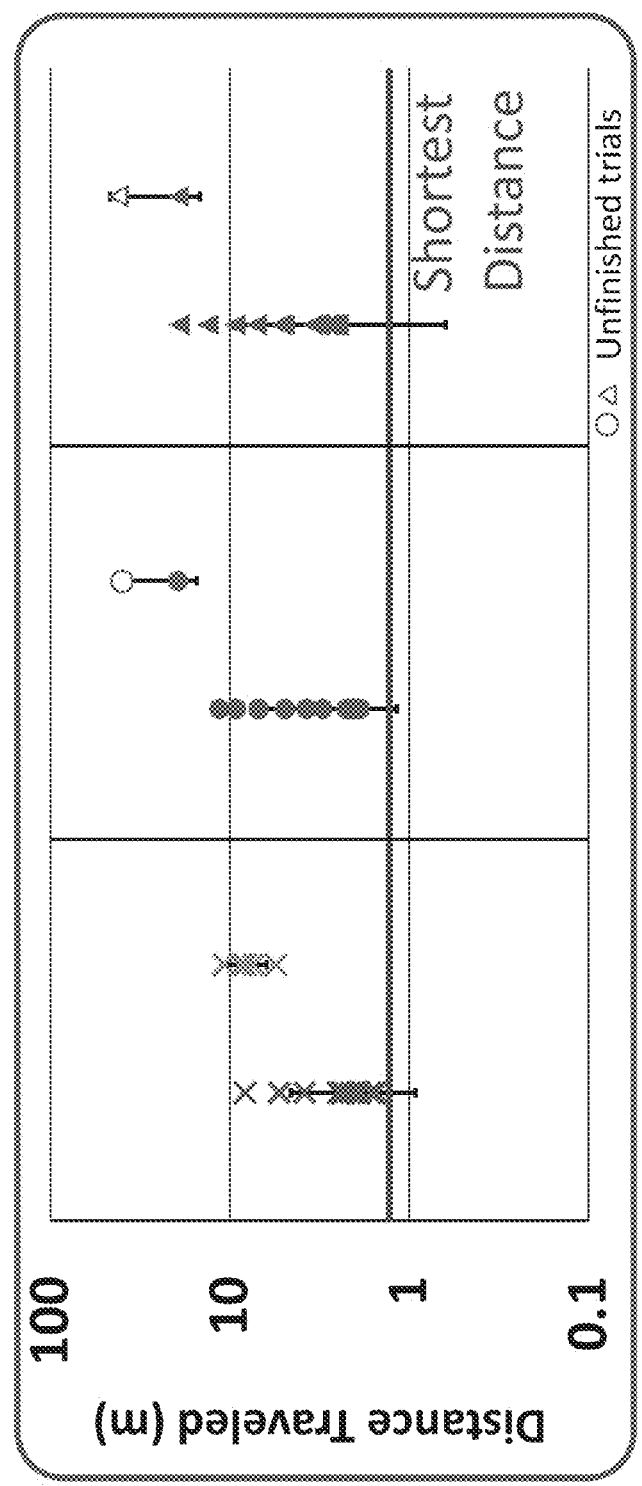

While spatial exploration systems in accordance with many embodiments of the invention possess the ability to generate 3D spatial models of an environment, 3D spatial models of virtual environments are able to be constructed in virtual reality systems. A benefit of using a virtual environment to simulate the effectiveness of spatial exploration systems in enabling visually impaired users to explore their environments and/or complete specific tasks is that the lack of actual objects within a virtual environment reduces the likelihood of injury due to collision. Accordingly, the effectiveness of spatial exploration systems similar to those described herein in enabling visually impaired users to explore their environments was assessed using 3D spatial models corresponding to virtual environments in a laboratory setting similar to that shown in FIG. 19. Three separate tasks performed by visually impaired users are described in FIGS. 20A-20C. The effectiveness of different users in completing the tasks is shown in FIGS. 20D-20F. A comparison of the effectiveness of the same user performing Task 2 (described in FIG. 20B) with the assistance of a spatial exploration system is provided in FIGS. 20G and 20H and FIGS. 20I and 19J. As can readily be appreciated, the spatial exploration system appears to assist each user to complete the task more efficiently than when using a cane to perform a similar task with real world objects. When conducting the experiments, all subjects learned to use the simulated spatial exploration systems in the first hour with simple instructions. Furthermore, with the cane alone, subjects 2 and 3 failed their first trials of task 2. FIGS. 20K and 20L show statistics collected during performance of task 2 by three subjects and demonstrate that task completion using the spatial exploration system was more efficient both with respect to time taken complete the task and with respect to the distance travelled to complete the task.

Although the present invention has been described in certain specific aspects, many additional modifications and variations would be apparent to those skilled in the art. It is therefore to be understood that the present invention may be practiced otherwise than specifically described, including various changes in the implementation other than those described herein such as (but not limited to) the use of alternative sonification systems (e.g. fixed speaker systems within an environment), without departing from the scope and spirit of the present invention. Thus, embodiments of the present invention should be considered in all respects as illustrative and not restrictive.

What is claimed is:

1. A spatial exploration system for visually impaired users, comprising:
   a sensor system;
   a speaker system comprising at least a left output channel, and a right output channel;
   a network interface;
   a processor; and
   memory containing a spatial exploration application;
   wherein execution of the spatial exploration application by the processor directs the processor to:
      acquire sensor data using the sensor system;
      construct a 3D spatial model using at least acquired sensor data;
      determine a location and orientation of a user within the 3D spatial model using at least acquired sensor data;
      retrieve a map describing the surrounding real world environment via the network interface, wherein the map comprises at least one map selected from the group consisting of a floor plan and 3D spatial data;
      determine a path through the 3D spatial model using the retrieved map;
      instantiate a 3D guide avatar at a location within the 3D spatial model;
      repeatedly:
         determine updated locations and orientations of the user within the 3D spatial model using at least acquired sensor data;
         determine updated locations of the 3D guide avatar with the 3D spatial model relative to the determined path through the 3D spatial model based upon the updated locations and orientations of the user, such that movement by the user towards the 3D guide avatar avoids collision with a real world object; and
         generate spatial sound based upon the position of the 3D guide avatar relative to the location and orientation of the user within the 3D spatial model, where the spatial sound is generated by modifying at least one audio clip to produce audio outputs on the left and right audio channels that simulate a sound originating at a location in the real world corresponding to the location of the 3D guide avatar within the 3D spatial model, and the spatial sound includes a navigational cue indicating a direction of travel.

2. The spatial exploration system of claim 1, further comprising:
   a mixed reality display;
   wherein execution of the spatial exploration application by the processor further directs the processor to display the 3D guide avatar.

3. The spatial exploration system of claim 1, wherein execution of the spatial exploration application by the processor further directs the processor to determine a path through the 3D spatial model by placing waypoints along a route determined using the map.

4. The spatial exploration system of claim 1, wherein execution of the spatial exploration application by the processor further directs the processor to:

identify a location of a real world feature present within the surrounding real world environment using at least acquired sensor data; and instantiate a 3D object at a location within the 3D spatial model corresponding to the location of the identified feature.

5. The spatial exploration system of claim 1, further comprising:

a network interface;

wherein execution of the spatial exploration application by the processor further directs the processor to:

retrieve information describing a feature likely to be present within the real world environment;

identify a location of the feature described in the retrieved information within the real world feature environment using at least acquired sensor data; and instantiate a 3D object at a location within the 3D spatial model corresponding to the location of the identified feature.

6. The spatial exploration system of claim 1, wherein execution of the spatial exploration application by the processor further directs the processor to modifying the audio clip by modulating the pitch of the sound based upon the position of the 3D object relative to the location and orientation of the user within the 3D spatial model to encode audio cues as to the location of the feature in the surrounding real world environment.

7. The spatial exploration system of claim 1, wherein execution of the spatial exploration application by the processor further directs the processor to:

instantiate a 3D collision perimeter object within the 3D spatial model in a location determined based upon the location and orientation of a user within the 3D spatial model;

repeatedly determine updated locations of the 3D collision perimeter object within the 3D spatial model based upon the updated locations and orientations of the user; and determine that a surface of the 3D collision perimeter object is contacting a surface within the 3D spatial model at a point of contact and generate a spatial sound encoding the point of contact.

8. The spatial exploration system of claim 1, further comprising:

a user input device;

wherein execution of the spatial exploration application by the processor further directs the processor to:

receive a user input via the user input device;

generate spatial sound based upon the position of the 3D guide avatar relative to the location and orientation of the user within the 3D spatial model in response to receipt of the user input via the user input device.

* * * * *